United States Patent
Petersen et al.

(10) Patent No.: US 6,484,207 B1
(45) Date of Patent: *Nov. 19, 2002

(54) SWITCHING SYSTEM HAVING INTERCONNECTS DEDICATED TO STORE AND RETRIEVE DATA INCLUDING MANAGEMENT OF DEDICATED MEMORY SEGMENTS ALLOCATED WHEN A GENERAL MEMORY IS DEPLETED

(75) Inventors: Brian A. Petersen, San Francisco, CA (US); James R. Rivers, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/340,857

(22) Filed: Jun. 28, 1999

Related U.S. Application Data

(60) Provisional application No. 60/108,780, filed on Nov. 17, 1998.

(51) Int. Cl.⁷ .............................................. G06F 15/16
(52) U.S. Cl. ..................... 709/232; 709/235; 709/238; 709/239; 709/250; 709/251; 710/131; 711/147; 711/149; 711/153
(58) Field of Search ........................ 709/223–232, 709/235, 238, 239, 250, 251, 252; 710/128, 129, 131, 132; 711/147, 149, 150, 153; 370/235, 357, 389, 422

(56) References Cited

U.S. PATENT DOCUMENTS

| | | | |
|---|---|---|---|
| 4,790,003 A | 12/1988 | Kepley et al. | |
| 5,138,657 A | 8/1992 | Colton et al. | |
| 5,448,698 A * | 9/1995 | Wilkes | 709/245 |
| 5,457,683 A | 10/1995 | Robins | |
| 5,469,432 A * | 11/1995 | Gat | 370/389 |
| 5,758,085 A * | 5/1998 | Kouoheris et al. | 709/231 |
| 5,905,725 A * | 5/1999 | Sindhu et al. | 370/389 |
| 6,021,132 A * | 2/2000 | Muller et al. | 370/412 |
| 6,084,856 A * | 7/2000 | Simmons et al. | 370/235 |
| 6,160,813 A * | 12/2000 | Banks et al. | 370/422 |
| 6,240,492 B1 * | 5/2001 | Foster et al. | 711/149 |
| 6,260,092 B1 * | 7/2001 | Story et al. | 710/128 |
| 6,317,427 B1 * | 11/2001 | Augusta et al. | 370/357 |

OTHER PUBLICATIONS

Brian Petersen et al., "Multi–Channel Data Transport Architecture," Patent Application No.: 60/108,780, Filing Date: Nov. 17, 1998, Patent Application.

* cited by examiner

*Primary Examiner*—Zarni Maung
*Assistant Examiner*—Nabil El-Hady
(74) *Attorney, Agent, or Firm*—Beyer Weaver & Thomas, LLP

(57) ABSTRACT

Methods and apparatus for providing a network data switch and buffer system are disclosed. In a switch having a memory associated therewith, the memory including a general memory and a plurality of dedicated memory segments, the general memory being available to a plurality of users associated with one or more network devices and each one of the plurality of dedicated memory segments being associated with one of the plurality of users, a method of storing data includes receiving data from a source network device connected to the switch. The data is then stored in a data buffer so that a portion of one of the plurality of dedicated memory segments is allocated when the general memory has been depleted.

15 Claims, 16 Drawing Sheets

Newport Architectural Elements

Cell Format

Register Access

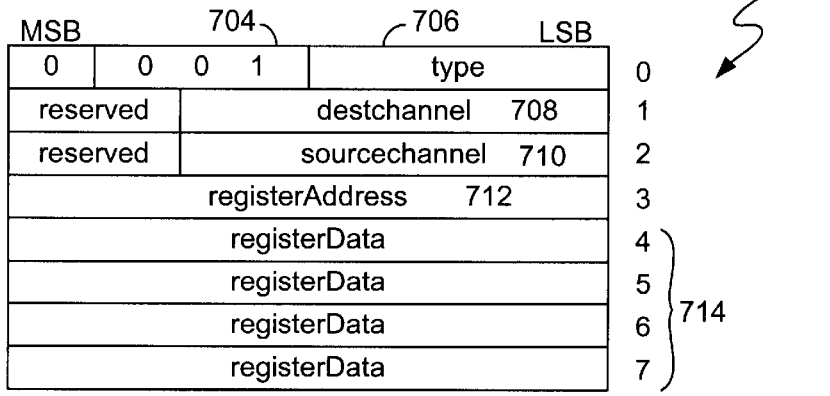

Register Access Molecule Format

FIG. 7A

Field Definitions

| Offset | Field Name | Mask | Field Definition |
|---|---|---|---|
| 0 | type | $0F_{16}$ | See table below. |
| 1 | destchannel | $3F_{16}$ | Destination channel number. |
| 2 | sourcechannel | $3F_{16}$ | Source channel number. |
| 3 | registerAddress | $FF_{16}$ | Address of register being accessed. |
| 4 | registerData | $FF_{16}$ | Most significant byte of *registerData*. |
| 5 | registerData | $FF_{16}$ | Next-to-most significant byte of *registerData*. |
| 6 | registerData | $FF_{16}$ | Next-to-least significant byte of *registerData*. |
| 7 | registerData | $FF_{16}$ | Least significant byte of *registerData*. |

FIG. 7B

Valid type fields for RegisterAccess molecules

| type | Reference | Description |
|---|---|---|
| $0_{16}$ | RegisterRead | Initiates reads of switch and satellite register maps. *registerAddress* identifies the target register. *registerData* is undefined. |
| $1_{16}$ | RegisterWrite | Initiates writes to switch and satellite register maps. *registerAddress* identifies the target register. *registerData* specifies the value written to the register. |
| $8_{16}$ | RegisterReply | Acknowledges RegisterRead and RegisterWrite molecules. *registerAddress* is derived from the original request while *registerData* reflects the current value of the register. |

FIG. 7C

MemoryAccess

MemoryAccess molecules are used to access switch and satellite memories

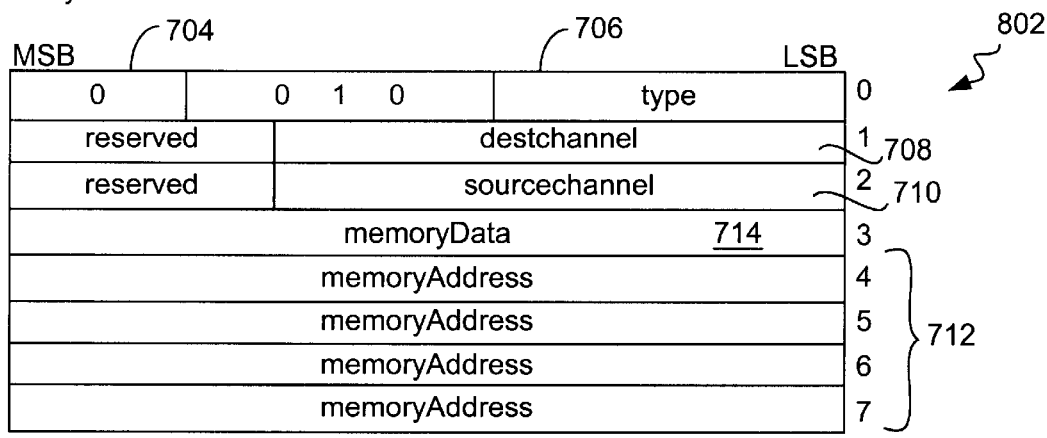

MemoryAccess Molecule Format

FIG. 8A

Field Definitions

| Offset | Field Name | Mask | Field Definition |
|---|---|---|---|
| 0 | type | $0F_{16}$ | See table below. |
| 1 | destchannel | $3F_{16}$ | Destination channel number. |
| 2 | sourcechannel | $3F_{16}$ | Source channel number. |
| 3 | memoryData | $FF_{16}$ | Addressed byte of *memoryData*. |
| 4 | memoryAddress | $FF_{16}$ | Most significant byte of *memoryAddress*. |
| 5 | memoryAddress | $FF_{16}$ | Next-to-most significant byte of *memoryAddress*. |
| 6 | memoryAddress | $FF_{16}$ | Next-to-least significant byte of *memoryAddress*. |
| 7 | memoryAddress | $FF_{16}$ | Least significant byte of *memoryAddress*. |

FIG. 8B

| type | Reference | Description |
|---|---|---|
| $0_{16}$ | MemoryRead | Used to initiate reads of memory maps. *memoryAddress* indicates the target memory element. *memoryData* is undefined. |
| $1_{16}$ | MemoryWrite | Used to initiate writes to memory. *memoryAddress* indicates the target memory element. *memoryData* is written to the targeted memory element. |
| $8_{16}$ | MemoryReply | Acknowledges MemoryRead and MemoryWrite molecules. In both cases, all fields are valid. *memoryAddress* is derived from the original request, while *memoryData* reflects the current value of the memory location. |

FIG. 8C

FrameRetrieval
Handles outbound frame requests from satellites.

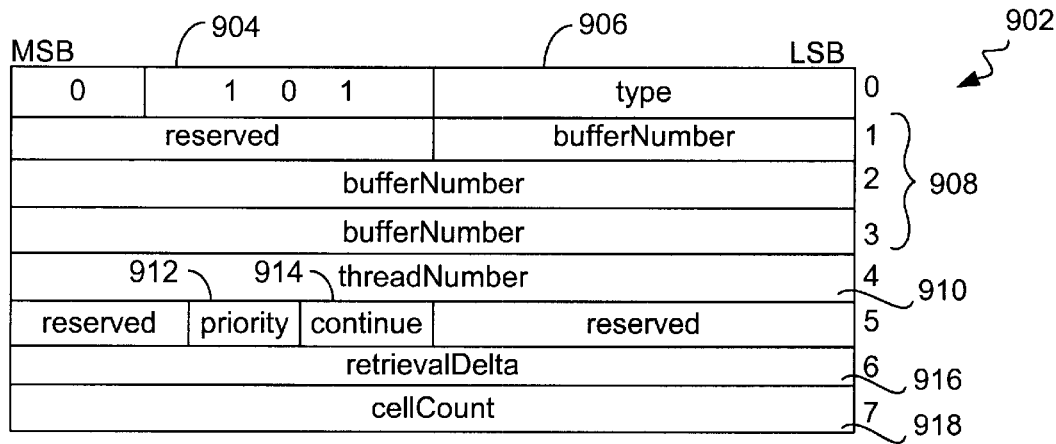

FrameRetrieval Molecule Format

FIG. 9A

Field Definitions

| Offset | Field Name | Mask | Description |
|---|---|---|---|
| 0 | type | $0F_{16}$ | See table below. |
| 1 | bufferNumber | $0F_{16}$ | Most significant 4 bits of *bufferNumber* |
| 2 | | $FF_{16}$ | Next-to-least significant byte of *bufferNumber* |
| 3 | | $F0_{16}$ | Least significant byte of *bufferNumber* |
| 4 | threadNumber | $FF_{16}$ | The thread that is requesting the frame. |
| 5 | priority | $20_{16}$ | Enables high-priority handling within the switch. |
| | continue | $10_{16}$ | Causes frame retrieval to pick up where it had left off. When asserted, *bufferNumber* is ignored. |
| 6 | retrievalDelta | $FF_{16}$ | The frame's retrievalCount value is decremented by the amount conveyed by this field. |
| 7 | cellCount | $FF_{16}$ | The number of cells to be retrieved. If a value of zero is specified, then all cells from the specified cell through to the end cell are retrieved and delivered to the satellite. A non-zero value results in the requested number of cells being delivered. The Switch will not proceed beyond an end cell. |

FIG. 9B

FrameStorage  Provides feedback to the satellite regarding the state of stored cells and switch congestion.

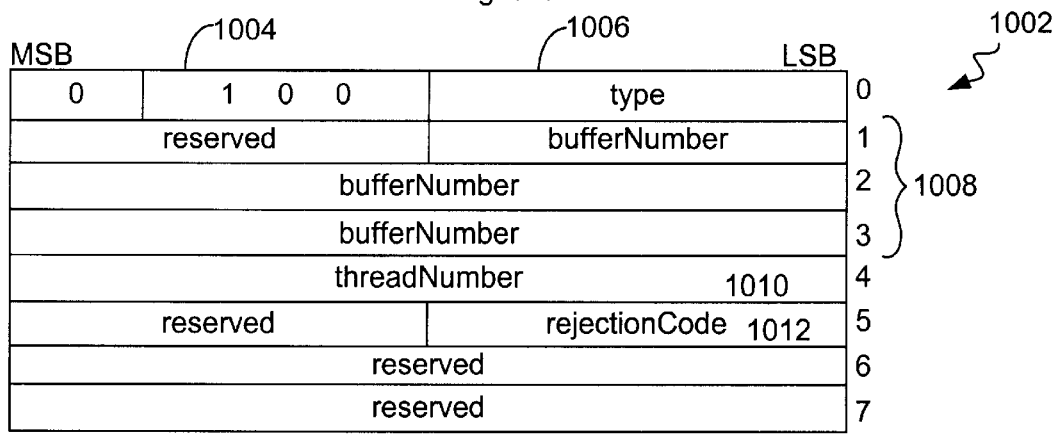

FrameStorage Molecule Format

FIG. 10A

Field Definitions

| Offset | Field Name | Mask | Field Definition |
|---|---|---|---|
| 0 | type | $0F_{16}$ | See table below. |
| 1 | bufferNumber | $0F_{16}$ | Most significant 4 bits of *bufferNumber* |
| 2 | bufferNumber | $FF_{16}$ | Next-to-least significant byte of *bufferNumber* |
| 3 | bufferNumber | $FF_{16}$ | Least significant byte of *bufferNumber* |
| 4 | threadNumber | $FF_{16}$ | The thread number issuing the BufferStatus molecule or to which a switch reply is addressed. |
| 5 | rejectionCode | $0F_{16}$ | See table 8. |

FIG. 10B

Valid type Field Values for FrameStorage Molecules

| type | Reference | Description |
|---|---|---|
| 0 | BufferStatusRequest | This molecule requests the congestion status for the thread specified in *threadNumber*. |
| 8 | StorageReply | Sent from the switch to a source satellite, this molecule returns a pointer (bufferNumber) to the frame being stored and a status code. bufferNumber is subsequently included in notifications to destination satellites of pending retrievals. |
| 9 | BufferStatusAck | This molecule returns the congestion status requested with a BufferStatusRequest molecule. |

FIG. 10C

BufferTableAccess Molecule Format

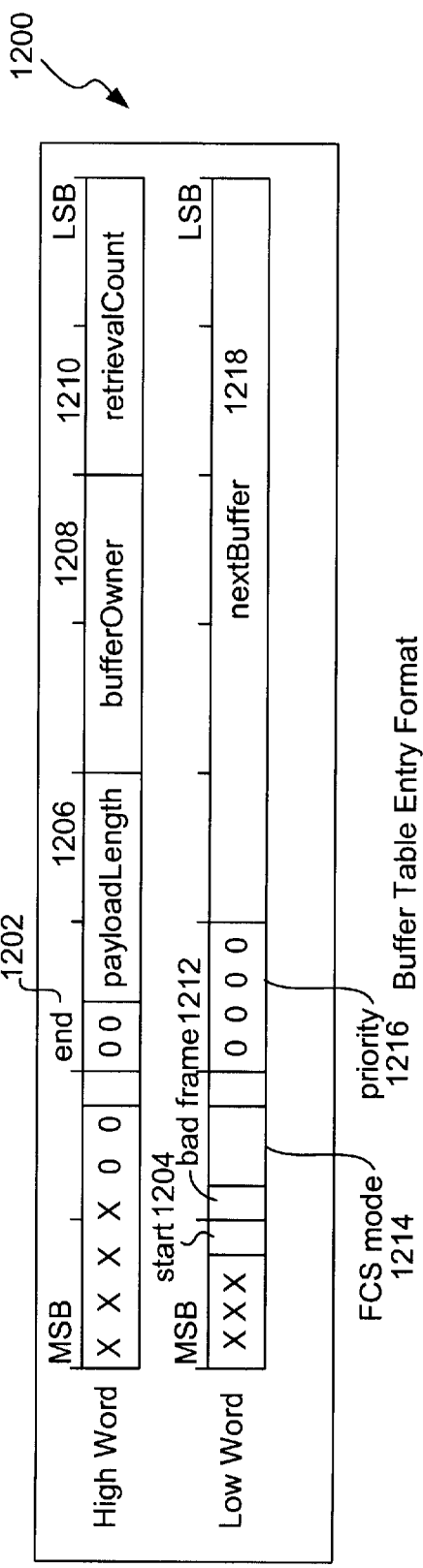

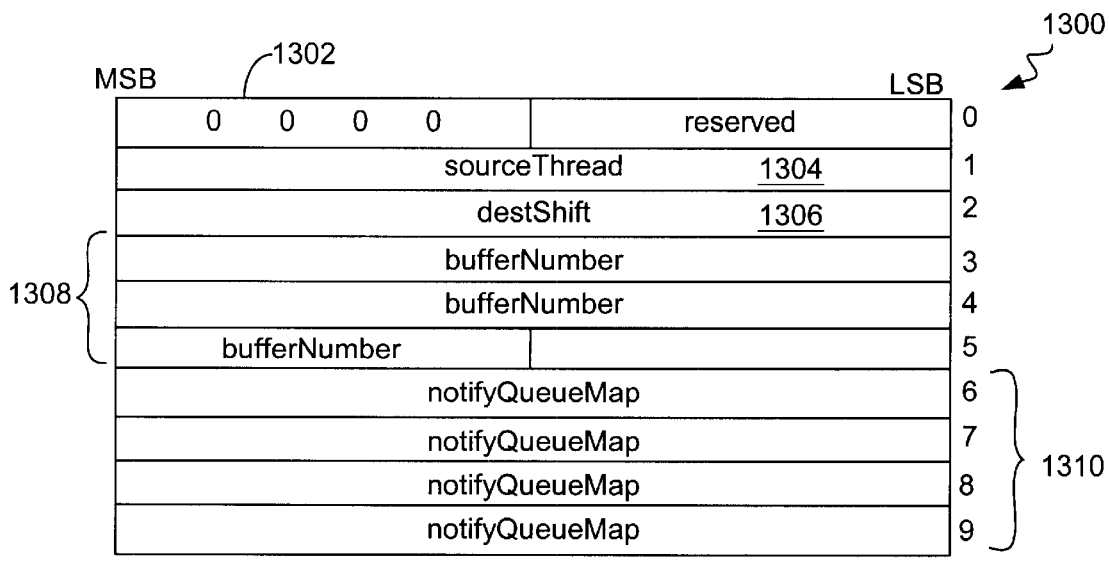

FrameNotify Format
FIG. 13A

FrameNotify Field Definitions

| Offset | Field Name | Mask | Description |
|---|---|---|---|
| 1 | sourceThread | $FF_{16}$ | The number of the thread that stored the frame is encoded here. |
| 2 | destShift | $FF_{16}$ | The bit map in *notifyQueueMap* is shifted left by the value in *destShift* to arrive at a properly offset destination queue map. |
| 3 | bufferNumber | $FF_{16}$ | This field indicates the buffer number of the cell that the destination satellites are expected to eventually request (most significant byte). |
| 4 | bufferNumber | $FF_{16}$ | (next-to-least significant byte) |
| 5 | bufferNumber | $F0_{16}$ | (least significant 4 bits) |
|  | userData | $0F_{16}$ | This field may be utilized in any way deemed appropriate by the source and destination satellites involved in the transfer of the particular FrameNotify molecule. |
| 6 | notifyQueueMap | $FF_{16}$ | This 32-bit field is used to specify a group of up to 32 Notify Queues that are destinations for this FrameNotify molecule. Those destinations that are able to process the molecule reset their corresponding notifyQueueMap bit as an acknowledgment to the source satellite. This byte conveys the most significant byte. The most significant bit of this byte corresponds to Notify Queue number 31 + (destShift * 32) |
| 7 | notifyQueueMap | $FF_{16}$ | Next-to-most significant byte. |

FIG. 13B

Free Slot Symbol

FreeSlot Molecule Format

SWITCHING SYSTEM HAVING INTERCONNECTS DEDICATED TO STORE AND RETRIEVE DATA INCLUDING MANAGEMENT OF DEDICATED MEMORY SEGMENTS ALLOCATED WHEN A GENERAL MEMORY IS DEPLETED

CROSS-REFERENCE TO RELATED APPLICATION

This application is related to U.S. application Ser. No. 60/108,780 filed on Nov. 17, 1998 and entitled "Multi-Channel Data Transport Architecture", which is hereby incorporated by reference.

This invention is related to U.S. patent application Ser. No. 09/340,577, filed on the same day as this patent application, naming Brian A. Petersen, Harish R. Devanagondi, and James R. Rivers as inventors, and entitled "Mixed Topology Data Switching System." That application is incorporated herein by reference in its entirety and for all purposes.

This invention is also related to U.S. patent application Ser. No. 09/340,854, filed on the same day as this patent application, naming Brian A. Petersen and James R. Rivers as inventors, and entitled "Channel Communication System." That application is incorporated herein by reference in its entirety and for all purposes.

This invention is also related to U.S. patent application Ser. No. 09/340,855, filed on the same day as this patent application, naming Brian A. Petersen, Harish R. Devanagondi, and James R. Rivers as inventors, and entitled "Methods and Apparatus for Providing Interfaces for Mixed Topology Data Switching System." That application is incorporated herein by reference in its entirety and for all purposes.

BACKGROUND OF THE INVENTION

1. Field of the Invention

The present invention relates to a mixed topology data switching system that combines a radial interconnect with a ring interconnect. More particularly, the radial interconnect permits devices to store and retrieve data using a switch, while the ring interconnect permits devices along the ring interconnect to provide notification that data has been stored for retrieval, as well as provide feedback regarding the ability or inability to retrieve such data.

2. Description of the Related Art

Although parallel busses may be advantageously used to convey data among devices, there are limits to the speed with which data may be transmitted. In order to increase the speed with which data is conveyed, previous approaches have typically centered around the use of wide parallel busses. However, as aggregate system bandwidths increase, these wide, long busses become problematic due to high pin counts and capacitance loading. Control pins as well as data pins must typically be provided, further increasing the width of the bus. It would therefore be desirable if the conveyance of data could be optimized while reducing the number of pins required.

Another commonly used data transport system is the ring. For instance, in a token ring, a single token circulates around the ring. In order to send a unit of data, a device must remove this token from the ring and replace it with the data to be transmitted. The permission to transmit rotates around the ring in a round-robin fashion. It is important to note that the ring typically provides only one token. As a result, only one device can transmit data at a given instant.

A drawback common to both parallel busses and rings is that each must be able to accommodate the aggregate of the entire system's data transfer volume even though only a small subset of the attached devices on these interconnect systems may actually need to be involved in the data transaction. In other words, the data cannot be sent directly to only those interfaces to which the data is addressed. Rather it is broadcast to all nodes on the interconnect system. Accordingly, it would be desirable if a system capable of limiting the distribution of unnecessary data to interfaces on an interconnect scheme could be implemented.

In controlling the flow of network traffic through a switching system, it is often desirable to provide feedback to the source of the data. For instance, although a transmitting device, hereinafter referred to as a "source device," may transmit or forward data to a receiving device, hereinafter referred to as a "destination device," the destination device may be incapable of handling the data. In these circumstances, the source device is often unaware that the data was not accepted by the destination device, complicating switch management. Common solutions to the problem of switch traffic management have included ensuring that all intended destination devices are "ready to receive" prior to transmitting data on a ring or bus interconnect, or insisting that each intended destination device send an explicit acknowledgement back to the source device. Both of these approaches result in reduced efficiency of the interconnect scheme. By way of example, in a ring network, such acknowledgment is typically provided in the data frame being transmitted. As another example, in other interconnect schemes, each such device may send a separate acknowledgment, therefore adding to the traffic on the network.

In addition to controlling the flow of traffic, the data transmitted from source to destination devices is often stored in memory until the data is transmitted to the destination devices. Moreover, in a switching system available to multiple entities, multiple source devices will often simultaneously require data buffers in the shared memory. As a result, various buffer management schemes have been implemented to manage this limited resource. Two approaches are commonly used in order to manage memory available to multiple devices. First, memory is often allocated on a first come, first served basis. According to this approach, when a source device wishes to obtain data buffer space for data being sent to one or more destination devices, the data buffer space is allocated for the data if the space is available. Thus, with the first come, first served approach, an aggressive consumer of buffers may deplete the data buffer space and will therefore deny buffer access to subsequent, less aggressive consumers.

Second, a common approach to memory management is the allocation of memory on a fixed allocation basis. According to this approach, each device has a fixed segment of the memory available for its use. However, aggressive users are penalized since they may obtain only a fixed amount of memory. This is particularly disadvantageous when the system is quiet, since there is no mechanism to reallocate memory from non-aggressive users to more aggressive users.

In view of the above, it would be desirable if a traffic management scheme were established which could provide such feedback to the source of the data while minimizing traffic management overhead. Moreover, it would be desirable if a more effective mechanism for managing the memory available to a switch could be implemented.

SUMMARY OF THE INVENTION

According to one embodiment, the present invention combines the use of two data transport methods: a point-topoint radial interconnect and a ring interconnect. The radial interconnect connects interface devices to each other through the services of a central switch device to permit the transport of data. Typically, a single interface has a single dedicated radial interconnect to the central switch. These interface devices are further connected to one another via a ring interconnect to convey retrieval notifications regarding forwarding of the data (by source devices) and receipt of the data (by destination devices).

Each radial interconnect provides a narrow, high baud-rate connection to convey the actual data from and to the associated interface without being burdened by the unrelated traffic for the remaining interfaces in the system. This is accomplished through the use of a central switch device, which stores and retrieves data for the various interfaces in the system. As will be apparent from the following description, this architecture provides numerous advantages over a wide parallel bus or ring.

The ring interconnect may be used to convey a "retrieval notification" (i.e., retrieval message) that may be observed by all potential retrieving interfaces. The retrieval notification notifies specific devices ("destination devices") or interfaces that one or more frames addressed to them are available from the switch device. Moreover, the ring interconnect permits each destination device to provide feedback to the source device letting the source know whether the destination has accepted the notification provided by the source device and therefore whether the destination can retrieve the data intended for it. The feedback is particularly useful in buffer management applications. In this manner, an efficient and flexible data transport and retrieval notification system that includes a feedback path to the source of the data is provided.

According to one aspect of the invention, the switch is implemented and operated in a manner that allows data to be conveyed to and from various interfaces without burdening the interfaces with the unrelated traffic addressed to the remaining interfaces in the system. Thus, a method of storing data by a switch having a data buffer associated therewith includes receiving data from a source network device connected to the switch. More particularly, the data is sent along the radial interconnect connecting the source network device to the switch. The data is then stored in the data buffer. In order to notify the source network device that the data has been stored for retrieval by the desired destination network devices, a frame storage message indicating that the data has been successfully stored for retrieval by the destination devices is sent to the source network device via the associated radial interconnect. Since the receipt of data and acknowledgment of receipt of the data by the switch is performed via the radial interconnect, other interfaces connected to the switch are not burdened by this unrelated traffic (e.g., via the ring interconnect).

According to another aspect of the invention, a mechanism for managing the memory associated with the switch is provided. The memory associated with the switch includes a general memory available to a plurality of users associated with one or more network devices (e.g., source network device or destination network device). In addition, the memory further includes a plurality of dedicated memory segments, each of which are associated with one or more of the plurality of users. When data is received from a source network device, the data is stored in the memory such that a portion of one of the plurality of dedicated memory segments is allocated when the general memory has been depleted. Thus, if the general memory is not depleted, the data is stored in the general memory. However, if the general memory is depleted, the data is stored in an appropriate dedicated memory segment in the memory. For instance, the data may be stored in the dedicated memory segment associated with the source device (or a destination device) or a particular user of the source device (or a destination device). Once a user's private reserve (or a device's private reserve) is consumed, it is denied further requests for buffers. This method allows an aggressive user to claim a significant portion of the buffers without denying other users of enough buffer space to continue operating efficiently. In this manner, the management of a buffer memory system in shared memory network data switch applications is significantly improved. Thus, an aggressive consumer of buffers cannot deny buffer access to other users as is possible with the first come, first served approach. Moreover, when the system is quiet, aggressive users are not penalized as with the fixed allocation method.

BRIEF DESCRIPTION OF THE DRAWINGS

FIG. 7 is a diagram illustrating an exemplary Register Access molecule format according to an embodiment of the invention.

FIG. 8 is a diagram illustrating an exemplary Memory Access molecule format according to an embodiment of the invention.

FIG. 9 is a diagram illustrating an exemplary format for a Frame Retrieval molecule according to an embodiment of the invention.

FIG. 10 is a diagram illustrating an exemplary format for a Frame Storage molecule according to an embodiment of the invention.

FIG. 12 is a diagram illustrating an exemplary Buffer Table Entry Format.

FIG. 13 is a diagram illustrating an exemplary Frame Notify message.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
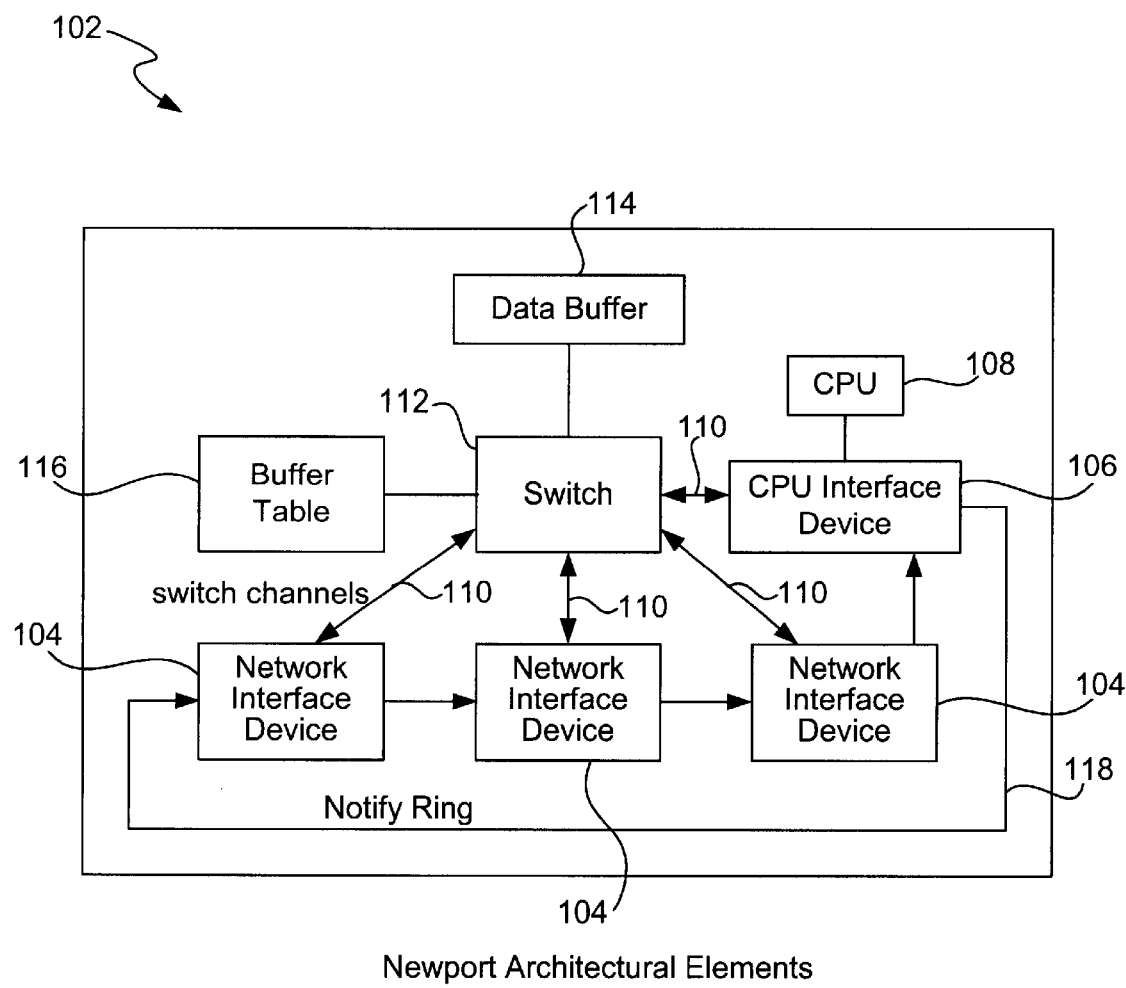
FIG. 1 is a block diagram of an exemplary system in which the present invention may be implemented according to an embodiment of the invention.

Referring first to FIG. 1, a block diagram of an exemplary system 102 in which the present invention may be implemented is illustrated. An interface device (i.e., source or destination device) may provide an interface to an attached device, which may be a network connection or a processing element such as a CPU. For instance, multiple interface devices 104 may provide interfaces to attached devices and a CPU interface device 106 may provide an interface to a CPU 108. The devices communicate via the corresponding interface devices 104 and 106 through separate radial interconnects 110 (i.e., switch interconnects) to a switch 112. More particularly, a source device may send data to a destination device via the switch 112. The switch stores the data in a Data Buffer 114. In addition, the switch 112 indicates in a Buffer Table 116 which buffers in Data Buffer 114 are available for storage and which data buffers in Data Buffer 114 have retrievals pending.

The CPU 108 may be used to initialize the system as well as provide various functions during operation of the mixed topology system. For example, the CPU may set up registers, provide a user interface, monitor the status of the switch, update tables with addresses of the network devices and perform other high level functions.

Once the data has been stored by switch 112, the source device receives the frame storage message from the switch indicating that the frame has been stored for retrieval by the destination device(s). When the source device receives this acknowledgment, the source device notifies each destination device that data has been stored for its retrieval. This is accomplished through the sending of a Frame Notify message (retrieval notification) via a ring interconnect 118. Upon receipt of the Frame Notify message by a destination device, the destination device modifies the Frame Notify message to acknowledge whether the data now stored by switch 112 can be retrieved by the destination device. Upon receipt of the modified Frame Notify message by the source device, the source device checks the modified Frame Notify message for an indication of which destination devices can retrieve the corresponding data. The source device may then notify the switch of any discrepancy between the number of designated destination devices and the number of destination devices that can retrieve the data. In other words, the number of "pending retrievals" is modified. Subsequently, when the switch is made aware that all intended destination devices capable of retrieving the data have obtained the data, the switch may release the buffers storing this data. Accordingly, memory space may be appropriately released upon notification that no retrievals remain pending.

Figure 2:
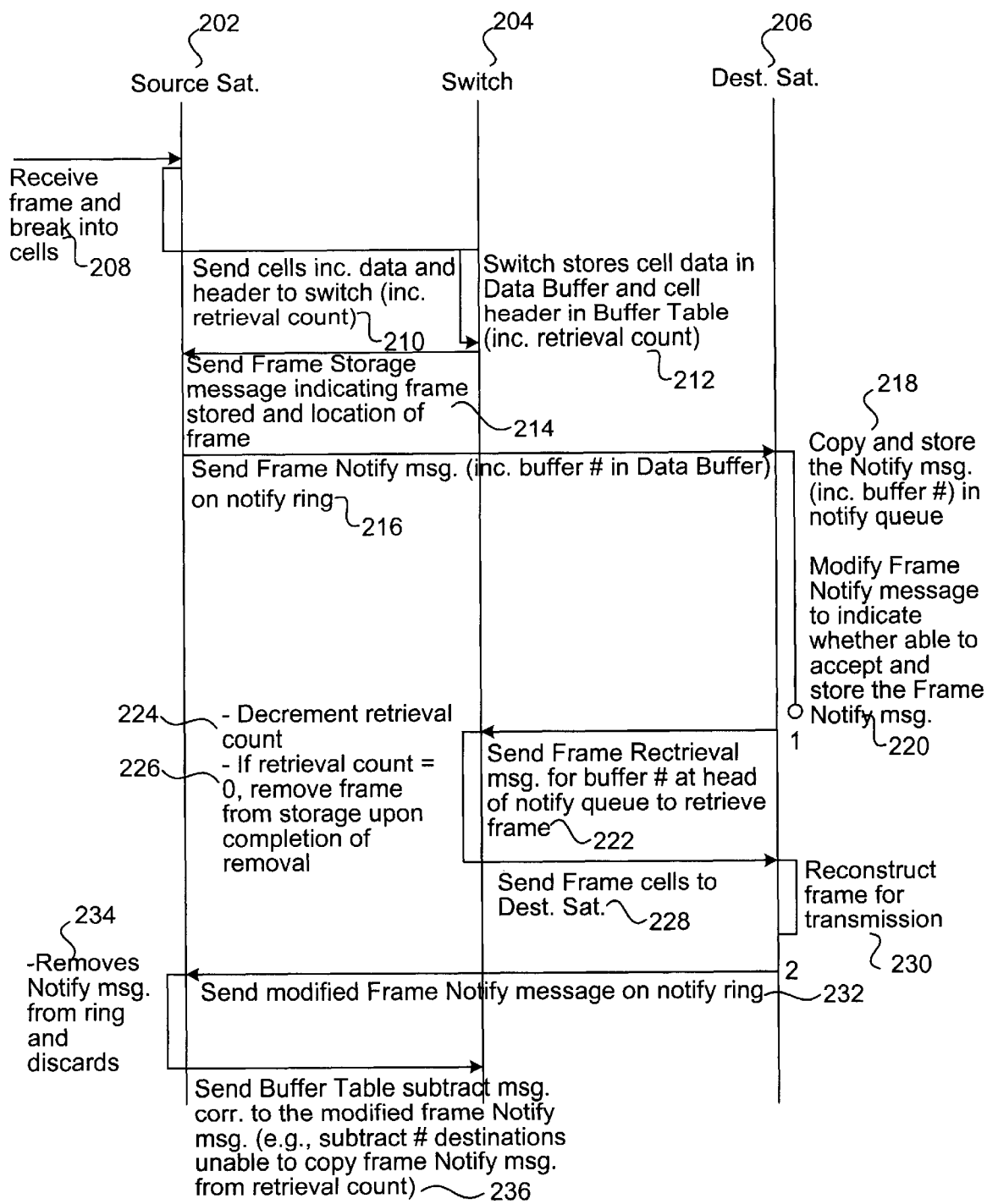
FIG. 2 is a process flow diagram illustrating a method of providing network communication according to an embodiment of the invention.

FIG. 2 is a process flow diagram illustrating in further detail a method of providing network communication in the above-described system according to an embodiment of the invention. As shown, process steps performed by a source device 202 are illustrated along an associated vertical line, steps performed by a switch 204 are illustrated along another vertical line, and steps performed by a destination device 206 are illustrated along still another vertical line.

A source device may wish to send data to one or more destination devices. For the sake of illustration only one destination device is employed in FIG. 2. Further, in the following description, the data is sent in the form of a frame which contains one or more cells. However, this description is merely illustrative and therefore the present invention may transmit any type of data.

As shown, the source device receives a frame and breaks the frame into cells at 208. By way of example, each cell may be encapsulated to include a header as well as data. An exemplary cell will be described in further detail with reference to FIG. 6. As will be shown, the cell header may specify the number of bytes in the cell, the position of the cell within the frame, and a retrieval count specifying the number of pending retrievals for the frame, among other items. Thus, the number of pending retrievals applies to each cell within the frame.

After breaking the frame into cells, the source device sends these cells to the switch along the radial interconnect at 210. The switch stores the cell data in the Data Buffer and the cell header in the Buffer Table at 212. This is performed for each cell in the frame. A Frame Storage message is then sent by the switch to the source device along the radial interconnect at 214 to indicate that the frame has been stored and to specify the location (e.g., buffer number or pointer) where the frame is stored. By way of example, the buffer number may specify the location of the first cell within the frame.

Once a frame has been successfully stored, the source device notifies each destination device that a frame has been addressed to it. This is accomplished through the sending of a Frame Notify message on the notify ring at 216. The Frame Notify message includes the relevant buffer number of the Data Buffer location associated with the stored data. Each potential retrieving device checks the Frame Notify message to determine whether it is a designated destination device. If it is a destination device, the destination device obtains information from the Frame Notify message to enable it to subsequently retrieve the data intended for it. However, the destination device may receive multiple Frame Notify messages before it can obtain the data identified in the previously received Frame Notify messages. As a result, the destination device may copy and store the Frame Notify message in a notify queue at 218. As indicated above, the Frame Notify message specifies the appropriate buffer number(s) to enable subsequent retrieval of the data. By way of example, a buffer number associated with the first cell in a frame may be specified. Although only one destination device is shown to simplify the illustration, multiple destination devices may similarly retrieve the data stored by the source device.

It is important that the destination device communicate its ability or inability to retrieve the data intended for it. Thus, the destination device modifies the Frame Notify message to indicate whether it was able to accept and store the Frame Notify message as shown at 220. The modified Frame Notify message may then be sent along the notify ring at node 2 in parallel with retrieval of the frame at node 1. Thus, after modification of the frame notify message at 220, there may be a delay prior to processing at nodes 1 and 2. In this manner, each destination device along the notify ring may modify the Frame Notify message to indicate whether it was able to accept and store the Frame Notify message.

If the destination device is capable of copying and storing the Frame Notify message in its notify queue, the destination device may then retrieve data from the buffers specified in the Frame Notify message. As described above, the notify queue may contain multiple Frame Notify messages. Thus, the destination device may obtain data from buffers identified in a selected Frame Notify message in the notify queue (e.g., at the head of the notify queue). This data may then be obtained by sending a Frame Retrieval message including the appropriate buffer numbers to the switch on the radial interconnect at 222. Upon retrieving the data requested by the destination device, the retrieval count is decremented by the switch at 224 to reduce the number of pending retrievals. If all destination devices capable of retrieving the data have retrieved the data via the switch (i.e., when the retrieval count is zero), the frame may then be removed from storage at 226 upon completion of the retrieval. By way of example, the frame starting at the location specified by the buffer number of the first cell in the frame may be obtained by the switch in a cell-by-cell manner. This may be accomplished through the use of a linked list or other data structure. The frame cells are then sent to the destination device on the radial interconnect at 228. The frame is then reconstructed at 230 for transmission onto a network segment.

As described above, each destination device modifies the Frame Notify message at 220. The modified Frame Notify message is then sent on the notify ring at 232. In this manner, the Frame Notify message may be modified by multiple destination devices as it is sent along the notify ring.

Upon receipt of the modified Frame Notify message, the source device removes the Frame Notify message from the notify ring. From the modified Frame Notify message, the source device may ascertain which destination devices were capable of retrieving the data. Since it has traversed the notify ring to each destination device, the Frame Notify message may be removed from the notify ring and discarded at 234.

Once a frame has been retrieved by all intended recipients capable of retrieving the data, the data buffers in which the frame is stored are preferably released for future use. Since the switch is responsible for storage of data, retrieval of data, and release of memory from the Data Buffer, the switch may release the data buffers when the retrieval count is equal to zero. More particularly, each retrieval causes a decrement of the retrieval count. As a result, the retrieval count is zero when all intended destination devices retrieve the data from the switch. However, since some or all of the intended destination devices may not be capable of retrieving the data, the actual retrieval count may be different from the retrieval count suggested by the frame when initially received by the source device. As a result, the switch is notified if there is any discrepancy between the intended number of recipients and the actual number of destination devices that retrieved the data. The source device therefore sends a Buffer Table Subtract message along the radial interconnect to the switch at 236. In response, the switch decrements the retrieval count consistent with the modified Frame Notify message at 236. In this manner, the switch is made aware that there are no further pending retrievals upon completion of the last pending retrieval. The to switch may then release the data buffers for subsequent storage by source devices.

Figure 3:
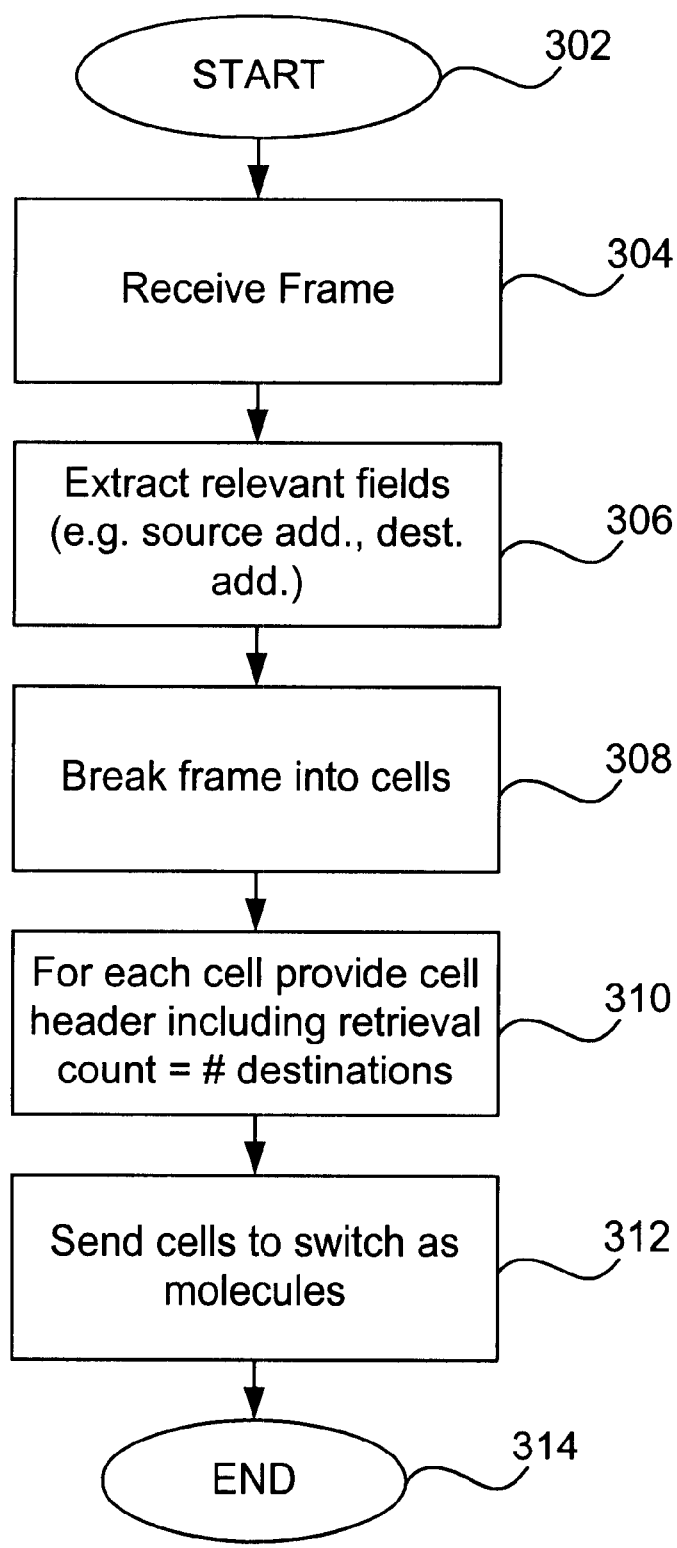
FIG. 3 is a process flow diagram illustrating steps performed by a source device prior to sending a frame according to an embodiment of the invention.

As described above, the source device sends each frame intended for one or more destination devices to the switch for storage. However, the frame may be too large to send in one cell. As a result, it may be necessary to break the frame into multiple cells. FIG. 3 is a process flow diagram illustrating steps performed by a source device prior to sending a frame according to an embodiment of the invention. This process corresponds to operations 208 and 210 of FIG. 2.

The process starts at 302 and at 304 a frame is received. The relevant fields are then extracted from the frame at 306. By way of example, the source address and the destination address may be obtained from the frame in order to determine the frame's forwarding requirements. For instance, the source address and the destination address may be submitted to a lookup table to determine the destination devices and associated notify queues to which the frame is to be addressed. As will be described below, the notify queues may be specified in a single "notify queue map" provided in the frame notify message. The frame is then broken into cells at 308. For each cell, a cell header is provided at 310. The cell header preferably includes a retrieval count specifying the number of intended destinations. The cells are then sent serially to the switch at 312. By way of example, each cell may be further divided into molecules prior to being sent to the switch 312. The process ends at 314.

Figure 4:
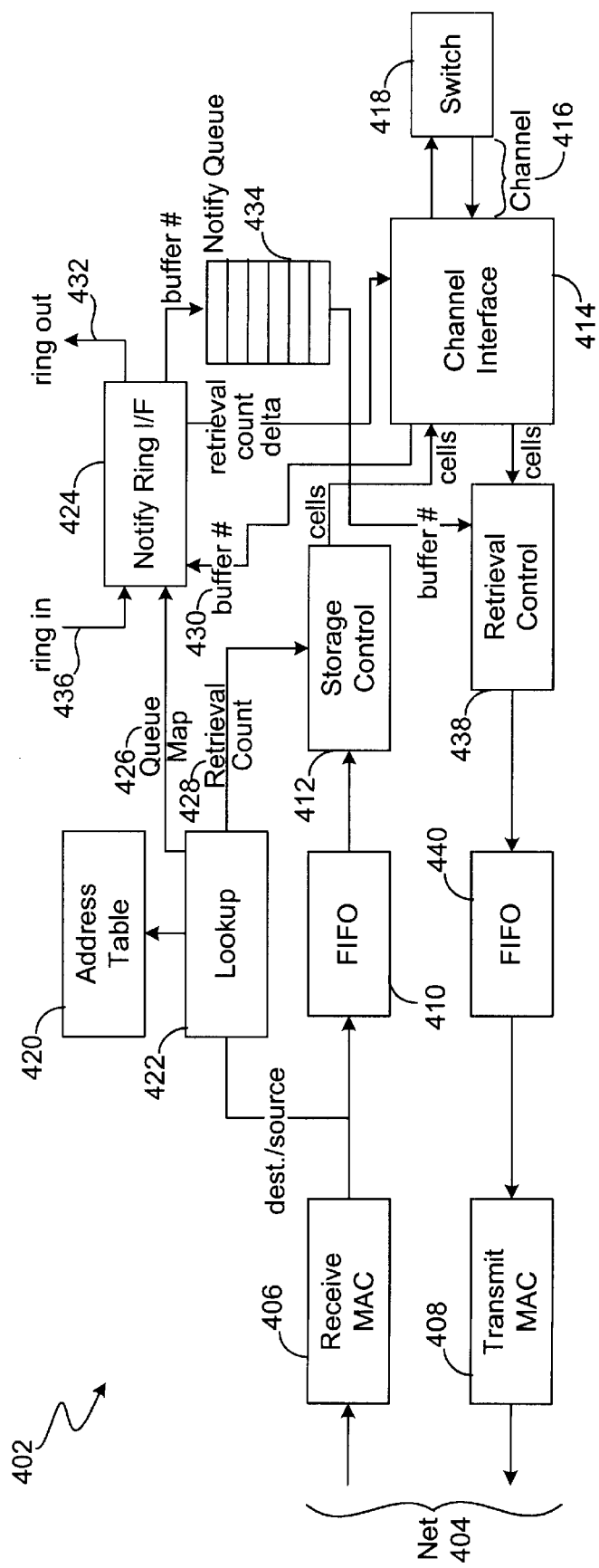
FIG. 4 is a block diagram illustrating an exemplary interface device according to an embodiment of the invention.

Each network interface device and switch may be designed using hardware as well as software. Moreover, the source network device and the destination device may be implemented separately as well as in a single device. FIG. 4 is a block diagram illustrating an exemplary network interface device according to an embodiment of the invention. In this embodiment, both the source and destination network devices are implemented in a single interface device. As shown, the network interface device 402 may receive and transmit data to a network 404 via a receive media access controller (MAC) 406 and a transmit media access controller (MAC) 408, respectively. When a frame is received by the receive MAC 406, the frame payload may be stored in an inbound queue 410 such as a FIFO queue. Each frame may then be broken into cells by a storage control block 412. The cells may then be further divided into molecules by the channel interface 414. As a result, two levels of encapsulation are provided to identify the data type on the channel. The molecules may then be sent by the channel interface 414 via a channel 416 to switch 418 for storage.

When a frame is received by the network interface device, the frame data is stored in the queue 410 while information provided in the cell header is obtained to determine the proper course of action for the frame data. By way of example, the cell header may specify a destination address and source address associated with the frame. Since it may be desirable to restrict the actions of various devices (e.g., source addresses), the address table 420 may specify rules that designate the permissible actions of each device. Thus, in order to determine how to handle the frame that has been received, information such as the destination address and source address may then be submitted to a lookup function or lookup table 422. Through the use of the lookup table 422, the number of destinations 428 associated with the frame may be obtained using the source and destination address. In this manner, the number of possible queues to which the frame is to be forwarded is determined.

Once the number of destinations 428 is determined, the number of destinations (i.e., retrieval count) 428 may then be provided in each cell that is sent to the switch. Thus, the retrieval count 428 is provided to the storage control block 412. The storage control block 412 breaks the frame received from the queue 410 into cells which may each include the retrieval count 428. The cells are sent to the channel interface 414 which further breaks the cells into molecules. The molecules are then sent on the channel 416 to the switch 418 for storage. Thus, the switch 418 may determine the retrieval count 428 of each cell.

When the frame is stored by the switch 418, the source device preferably receives an acknowledgment that the data has been stored. Thus, to provide this feedback, a frame storage message (i.e., storage reply) is sent from the switch 418 on the channel 416 to the channel interface 414. The frame storage message is then provided to the notify ring interface as shown at 430 and sent on the notify ring. Once this acknowledgment is received by the interface device 402, the designated destination devices may be notified via notify ring interface 424. As described above, a Frame Notify message may be sent via the notify ring interface 424 to the destination devices. More particularly, the Frame Notify message may identify one or more destination devices for the frame and specify the location of the frame to be retrieved. By way of example, the location of the frame to be retrieved by the destination devices may be designated by a buffer number 430. In addition, the destination devices for the frame may be specified in the Frame Notify message through a notify queue map 426. More particularly, the notify queue map 426 may specify a notify queue associated with a particular destination device. The notify queue may be expressly designated through the use of one or more bits as well as implied through the specification of a priority level for the data. The notify queue map 426 will be described in further detail with reference to FIG. 13. The notify ring interface 424 then creates a Frame Notify message including the notify queue map 426 and the buffer number 430 which is then sent on an outbound interface of the notify ring 432.

Once the Frame Notify message is copied and stored in a notify queue 434 by a destination device, the appropriate bit(s) in the notify queue map field of the Frame Notify message are turned off to indicate that the Frame Notify message was stored in the notify queue 434. Alternatively, the notify queue 434 available to the interface device as destination network device may be temporarily full or otherwise disabled. Therefore, the appropriate bit(s) in the notify queue map field of the Frame Notify message may be left on to indicate that the Frame Notify message could not be stored in the notify queue 434.

In addition to sending cells to the switch 418 for storage, a device may send a Frame Retrieval message to the switch to retrieve selected data from the switch 418. More particularly, the Frame Retrieval message utilizes the buffer number provided in the notify queue to specify which frame is to be retrieved. The channel interface 414 obtains the requested data from the switch 418, it sends the cells to a retrieval control block 438 which builds frames from the cells. The retrieval control block 438 then sends each frame upon completion to an output buffer 440 such as a FIFO queue. The transmit MAC 408 then transmits the frame via the network 404.

Figure 5A:
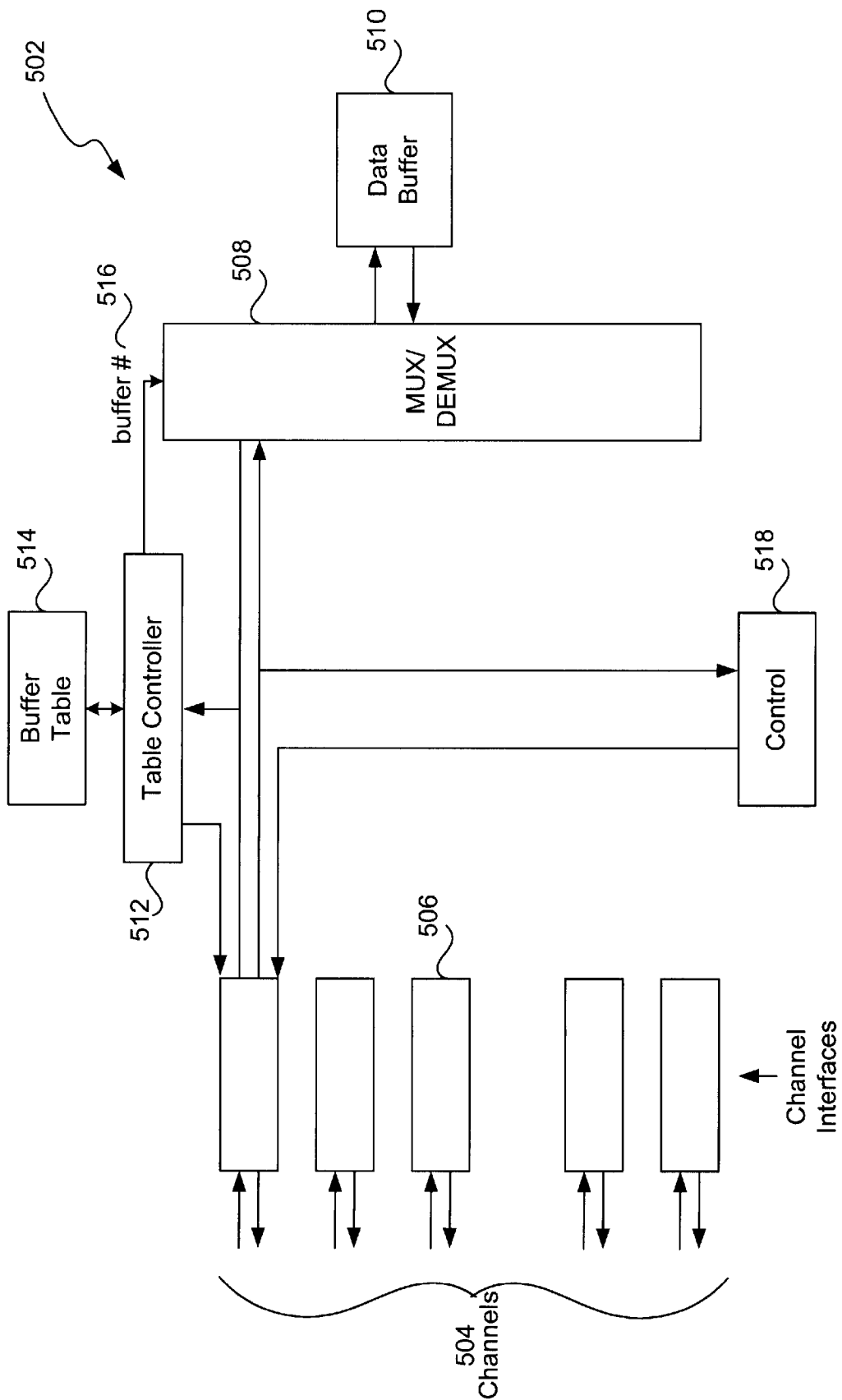
FIG. 5A is a general block diagram illustrating an exemplary switch according to an embodiment of the invention.

A general block diagram illustrating an exemplary switch according to an embodiment of the invention is presented in FIG. 5A. As shown, a single switch 502 may transmit and receive data via multiple channels 504 through corresponding channel interfaces 506. In this manner, data may be sent and received by interface devices coupled to the channels 504. Data is received by the switch in the form of molecules. The payloads of those molecules which are "cell" type molecules may be sent to a multiplexer/demultiplexer 508 for storage in data buffer 510. In addition, the header of the cell type molecules are sent to table controller 512. The table controller then stores the cell headers in a buffer table 514. The information stored in the buffer table 514 may further include the number of pending retrievals for that cell and the buffer owner of the cell. Data types for cells and molecules will be described in further detail with reference to FIGS. 6 through 11.

When data (e.g., cells) is received by the switch 502, the multiplexer/demultiplexer 508 stores cells received by the switch in the data buffer 510. In other words, the receipt of cells by the switch indicates to the switch that the cells are to be stored. Similarly, in response to a Frame Retrieval message sent by an interface device to the switch 502, the multiplexer/demultiplexer 508 retrieves cells from the data buffer 510 corresponding to the one or more buffer numbers 516 specified by the table controller 512. When a frame is retrieved by the switch 502, the retrieval count associated with the frame and stored in the buffer table 514 is decremented by the table controller 512. When the retrieval count reaches zero, the switch removes the frame from storage in the buffer table and the data buffer upon retrieval of the frame.

In order for the switch to function properly, it is important that the retrieval count associated with each buffer in the Data Buffer is accurate. More particularly, the retrieval count is updated to reflect the number of destination devices that cannot retrieve the data. As described above, each destination device may provide feedback to the source device that indicates whether that destination device is capable of retrieving the data intended for it. Thus, the Frame Notify message may be modified by each destination device before it returns to the source device. When the modified Frame Notify message is received by the source device, the source device sends a buffer table subtract message to the switch corresponding to the modified Frame Notify message. By way of example, the buffer table subtract message may specify the number of destination devices that could not store information provided in the Frame Notify message. In this manner, the number of destinations unable to copy the frame notify message is subtracted from the pending retrieval count of each corresponding Buffer Table entry. As shown in FIG. 5A, when the buffer table subtract message is received by the switch 502, the table controller decrements the pending retrieval count associated with the specified cell. More particularly, the table controller may modify the pending retrieval count consistent with the notify queue map indicating those destinations which were unable to copy the Frame Notify message.

As described above, the switch may store or retrieve molecules that are cell type molecules. In all other instances, the molecules received by the switch are sent to a control block 518. Thus, the control block 518 assists in performing functions other than data storage or retrieval. For instance, the control block 518 may provide the molecules to blocks that supply register or memory access.

Figure 5B:
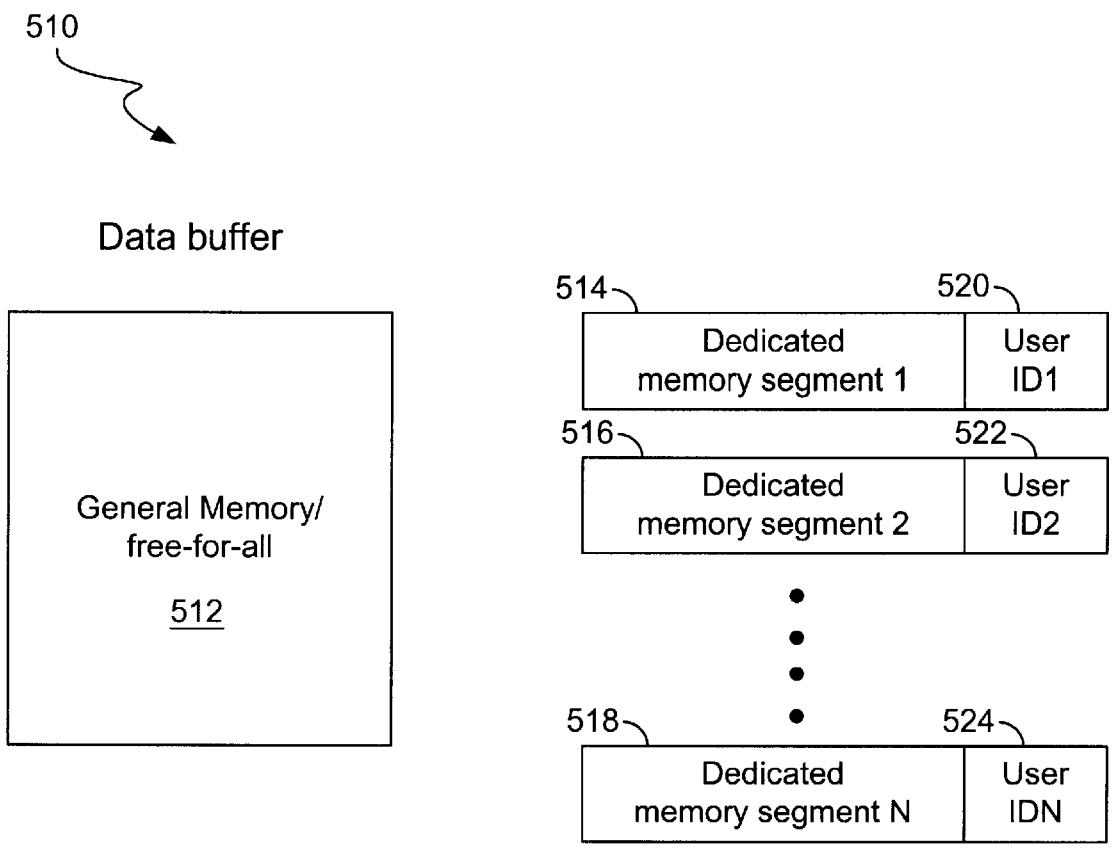
FIG. 5B is a block diagram illustrating a data buffer management scheme that is used according to one specific embodiment of the invention.

As shown and described above with reference to FIG. 5A, memory in the data buffer 510 is distributed for storage of data when the data (e.g., cells) are received by the switch. FIG. 5B illustrates a data buffer management scheme that is used according to one specific embodiment of the invention. The available buffer space in the data buffer 510 is divided up into two distinct groups of buffers: a general memory 512 and a plurality of dedicated memory segments 514, 516, and 518. More particularly, the general memory 512 is available to all users (i.e., source network devices or source threads) of the data buffer 510. On the other hand, each of the dedicated memory segments 514, 516, and 518 may be allocated only to a particular user associated with the dedicated memory segment. For example, each dedicated memory segment 514, 516, and 518 may be associated with a user identifier 520, 522, and 524, respectively. The user identifier may identify a user through any mechanism, including but not limited to an identification of a source network device or source thread.

During normal operation, the general memory 512 is allocated on a first come, first served basis. Once all of the general memory 512 has been allocated, the system is considered to be congested and further buffer allocation is drawn from each user's private reserve of buffers (i.e., dedicated memory segment). Once a user's private reserve is consumed, it is denied further requests for buffers. This method allows an aggressive user to claim a significant portion of the buffers without denying other users of enough buffer space to continue operating efficiently. In this manner, the management of a buffer memory system in shared memory network data switch applications may be significantly improved. Thus, an aggressive consumer of buffers cannot deny buffer access to other users as is possible with the first come, first served approach. Moreover, when the system is quiet, aggressive users are not penalized as with the fixed allocation method.

Figure 6:
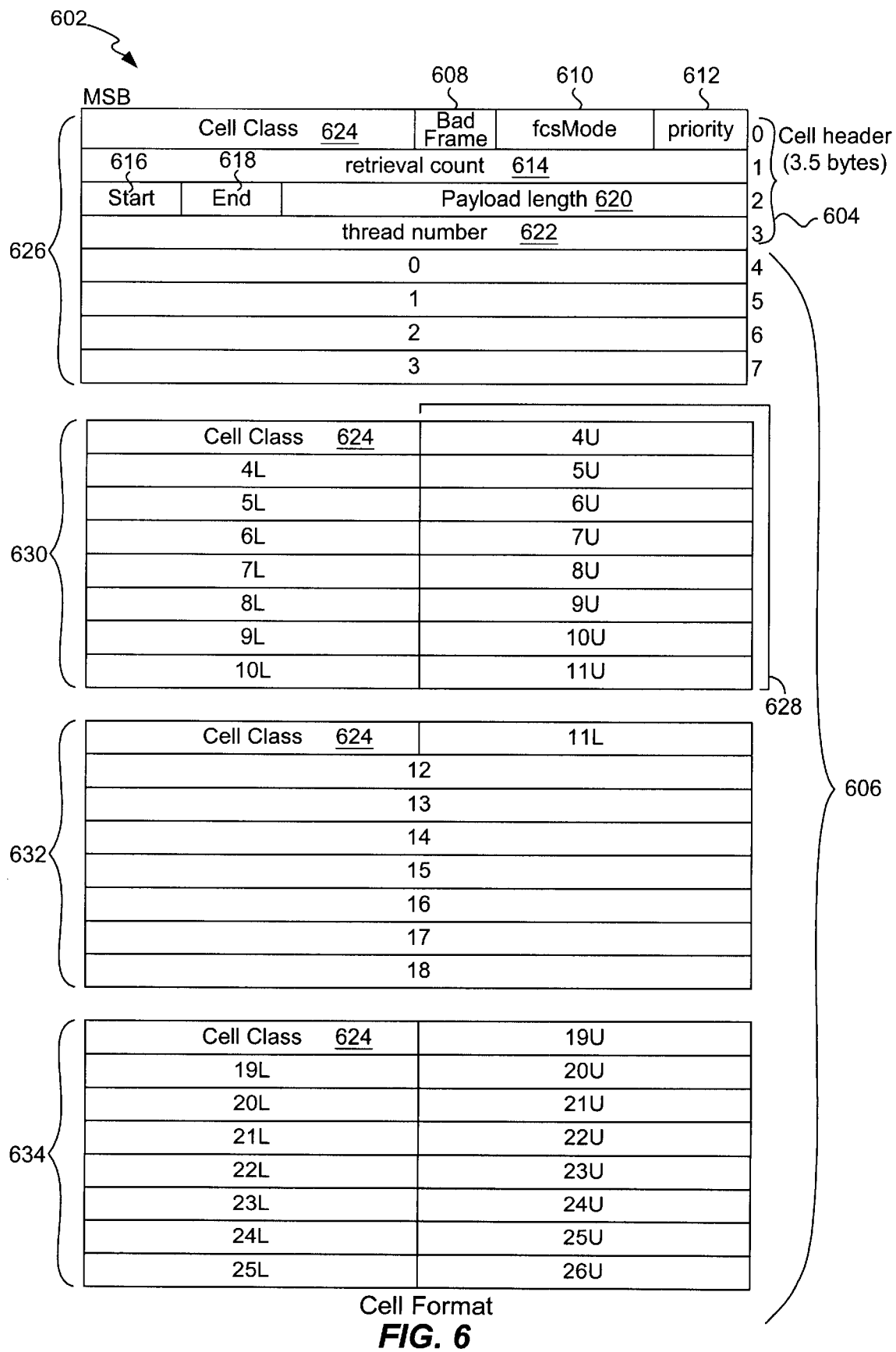
FIG. 6 is a diagram illustrating an exemplary cell format according to an embodiment of the invention.

Although the data stored and retrieved by the switch may take any form, the data is described as being a frame sent to the switch as cells. Thus, each frame consists of one or more cells. Moreover, each cell may include multiple molecules. FIG. 6 is a diagram illustrating an exemplary cell format according to an embodiment of the invention. As shown, the cell 602 includes a header 604 and a payload 606. The cell header 604 includes a bad frame field 608 that indicates whether the frame is defective. By way of example, the frame may not be valid if the length is too long, too short, or if the frame is improperly aligned. If the frame is not valid, it may not be forwarded.

In addition, a frame check sequence (FCS) mode field 610 establishes the FCS mode for the frame. The FCS mode field 610 defines the operation to be performed on a frame by a destination device with regards to the frame's FCS field. The FCS field may be provided in the last four bytes of the frame in order to perform a cyclic redundancy check (CRC) on the frame. The FCS mode field of the first cell of a frame applies to the entire frame. There are four possible FCS modes and therefore the FCS mode field 610 may comprise two bits. In a preserve mode, the FCS is preserved. In an append mode, a CRC is appended to the frame. In other words, after the last byte of the frame is retrieved from the switch, the retrieving interface device appends a new FCS value that it has computed. This may be useful where the frame does not contain a FCS. Alternatively, it may be desirable to provide two frame check sequences. By way of example, this mode may be used where the FCS field is positioned at the end of the frame. In a remove mode, a frame check sequence is removed from the frame. When a destination interface device is commanded to remove a FCS field, the field is deleted and any resulting gap in data may be closed by the destination device. In this manner, the introduction of errors into the data stream is prevented. This may be beneficial, for example, if the frame includes two frame check sequences and only one is desired. In a replace mode, the FCS field of the frame retrieved from the switch is discarded by the retrieving interface device and an FCS value computed by that device is transmitted in its place.

A priority field 612 is used to assign a priority to the cell. In this manner, high priority requests may be accessed by the switch's Data Buffer system prior to normal priority requests. The priority field 612 may include one or more bits. By way of example, the assertion of a priority bit may indicate a high priority status. Thus, when Data Buffer storage is low, low priority cells may be discarded. According to one embodiment, the priority does not affect retrieval or storage queuing, only Data Buffer access preference.

The cell header 604 further includes a retrieval count field 614. The retrieval count field 614 specifies the number of pending retrievals for the cell. When a cell received from a source device is stored by the switch, its retrieval count field 614 is copied to the retrieval count field of the location within the Buffer Table that corresponds to the buffer in the Data Buffer that is used to store the cell.

A cell may convey one of four parts of a frame: the start, the middle, the end, or the entire frame. Thus, the cell header 604 includes two bits to communicate this information. As shown, the cell header 604 includes a start field 616 and an end field 618 to convey this information. The appropriate field is set to indicate that the cell is the first or last cell in a frame. Similarly, when both fields are set, the frame is a single cell frame. When neither field is set, the cell lies in the middle of the frame.

As described above, a cell may include between 1 and 64 bytes. As a result, it is necessary to specify the length of the cell. Thus, payload length field 620 specifies the number of valid payload bytes. According to one embodiment, at least one byte is carried by each cell. Thus, when the payload length is equal to 0, it indicates that the payload field actually holds 64 valid bytes.

It may be desirable to multiplex data associated with multiple ports on a single channel. While multiple frames may be intermingled on a single channel and cell class molecules can be intermingled with molecules of other classes, sequence information is not stored in cells and therefore molecules from different cells cannot be multiplexed together. Thus, for buffer management purposes, it is important for the switch to associate the storage of a frame to the owner of the frame (e.g., a single thread), not merely to a switch channel. Thus, the cell header 604 includes a thread number field 622 that specifies the thread number. The thread number (e.g., source port number) is a unique identifier of a single thread. The thread number from the thread number field 622 may then be stored in the buffer table in the allocated buffer's buffer owner field. The thread number field 622 may comprise 8 bits. Thus, the cell header 604 may comprise a total of to 3.5 bytes.

The payload 606 of the cell may be variable in length with a maximum cell length of 64 bytes. As described above, the payload length may be specified in the cell header. Thus, a cell may include a variable number of molecules. Each molecule has a specified data type 624 (e.g., cell class). In addition, the first molecule 626 in the cell 602 includes the cell header 604. However, subsequent molecules in the cell 602 do not include a cell header. Thus, each molecule after the first molecule includes only a data type 624 and data 628 being transmitted.

When a cell is broken up into molecules for transmission across a switch channel, the left-most bit of the string is mapped to the left-most bit of the first molecule's molecule payload field. The mapping continues in this fashion until all valid bits of the string that constitute a cell have been mapped to molecules. Thus, the left-most bit of the payload field of the second molecule 630 corresponds to the upper byte of the next word in the cell. However, the left-most bit of the payload field of the third molecule 632 corresponds to the lower byte of the next word in the cell. As shown, the left-most bit of the payload field of the fourth molecule 634 includes an upper byte of the next word in the cell. Accordingly, there are three possible data alignments for a molecule within a cell: the first includes the cell header, the second includes a left-most bit corresponding to the lower byte of the next word in the cell, and the third includes a left-most bit corresponding to the upper byte of the next word in the cell. After the last valid data byte of a cell has been sent across a channel, the next molecule of the cell class may be the first part of the subsequent cell. While a cell is variable in length, each molecule payload is 7.5 bytes. As a result, there is no need to specify a molecule length in the cell header. Accordingly, bits used are minimized. Moreover, since information in the header is reduced, processing time is minimized. This is particularly advantageous where time-critical information is being transmitted.

As described above, a data type may be provided for each molecule. This data type or "class" may be one of the following switch control messages: Register Access, Memory Access, Frame Retrieval, Frame Storage, Buffer Table Access. In addition, a Frame Notify and Free Slot type or "class" may be specified for messages that are provided on the notify ring. These molecule and message types will be described in further detail with reference to the following figures. The Register Access and Memory Access molecules may be used for initialization and monitoring the status during the operation of the switch system. As shown in FIG. 7, an exemplary Register Access molecule format according to an embodiment of the invention is illustrated. The Register Access molecule 702 includes a class type 704 specifying that the class is Register Access. In addition, a Register Access type field 706 specifies the type of Register Access molecule, as will be described below. A destination channel number 708 and source channel number 710 are also provided in the Register Access molecule 702. The source and destination channel numbers 708, 710 may specify a channel. Alternatively, the source and destination channel numbers 708, 710 may specify the switch where the channel number is equal to 0. The Register Access molecule further includes the address of the register being accessed 712 and register data 714.

Various registers may be accessed. These registers may be used for a variety of purposes, such as configuration, status checking, and gathering statistics. In addition, register maps may be provided that indicate the location (e.g., device identification value or address) of each register.

In order to access the registers, three types of Register Access molecules are provided: Register Read, Register Write, and Register Reply. The Register Read molecule initiates reads of switch and interface device registers specified by the register address 712. Similarly, the Register Write molecule initiates writes of the register data 714 to switch and interface device registers designated by the register address 712. The Register Reply molecule acknowledges Register Read and Register Write molecules. Through the use of these molecules, the switch and the devices may determine and control the value of fields listed in an entity's register map. By way of example, by specifying the address of the switch, an interface device may read the switch's register map.

Various code and data sections may be stored in specific areas in memory within the switch and interface devices. As a result, a memory map may be used to specify where each such code and data section is stored. In order to access various locations in memory, a Memory Access molecule may be used. FIG. 8 illustrates an exemplary Memory Access molecule format 802 according to an embodiment of the invention. As shown, the Memory Access molecule is almost identical to that of the Register Access molecule. While the Register Access molecule provides one byte for the address 712 and four bytes for the data 714, the Memory Access molecule provides four bytes for the address and one byte for the data 714. Through the use of the Memory Access molecules, the devices may read and write the switch's or another interface device's memory map. As described above with respect to Register Access molecules, when a switch or an interface device receives a Memory Read or Memory Write, it replies with a Memory Reply. The destination of the reply is determined by the value in the original request molecule's source channel field. Register and Memory Access molecules are conveyed from interface device to interface device via a forwarding function embodied in the switch.

The Frame Retrieval molecule may be used by an interface device to request retrieval and delivery of a frame from the switch to the interface device. An exemplary format for a Frame Retrieval molecule according to an embodiment of the invention is illustrated in FIG. 9. As shown, the Frame Retrieval molecule 902 includes its data type 904 (e.g., Frame Retrieval) as well as a Frame Retrieval type 906 associated with the Frame Retrieval being performed. A buffer number 908 associated with the frame being retrieved is included. Moreover, a thread number 910 identifying the thread that is requesting the frame is provided. A priority indicator 912 enables high-priority handling within the switch. In addition, a continue field 914 indicates that frame retrieval resumes where it previously stopped. In other words, assertion of the continue field 914 indicates that the request corresponds to a continuation of the frame of the same thread number. Alternatively, when the continue field 914 is not asserted, the first cell of the frame is being requested. Thus, when the continue field 914 is asserted, the buffer number is ignored by the switch. Since it is sometimes desirable to decrement the retrieval count of a given frame by some value other than one, a retrieval delta 916 is specified. The frame's retrieval count value stored in the Buffer Table is then decremented by the amount conveyed by this field. By way of example, the retrieval delta 916 may be used to specify the number of intended destinations that were unable to copy the frame notify message and therefore unable to retrieve the data. As another example, the retrieval delta 916 may be set to zero to prevent the frame's retrieval count from being modified by a retrieval operation. As described above, the retrieval count is stored for each cell. Therefore, the retrieval count for each cell in the corresponding frame may be decremented. Moreover a cell count 918 indicates the number of cells to be processed (e.g., retrieved). When the cell count 918 is zero, all cells from the specified cell through to the end cell of the frame are retrieved and delivered to the interface device. A non-zero value results in the requested number of cells being delivered. The switch will not proceed beyond an end cell.

There are several types of Frame Retrieval molecules as specified by the Frame Retrieval type field 906. The Frame Retrieval molecule may be a Frame Request molecule or a Frame Invalid molecule. A Frame Request molecule is used by an interface device to request a frame from the switch. An interface device sends a Frame Request molecule to direct the switch to retrieve a certain quantity of cells from the linked list of cells starting with the cell stored in the specified buffer or to continue a previous retrieval if the continue bit is asserted. The buffer of the first cell of a frame may be specified in the Frame Request molecule's buffer number field 908. The number of cells to be retrieved is specified in the cell count field 918. When the Frame Request is valid, the cells are retrieved and provided to the interface device. However, if the frame requested does not exist or the request is otherwise invalid, a Frame Invalid molecule may be provided by the switch to the requesting interface device. By way of example, when the retrieval count field (e.g., stored in the Buffer Table) associated with a cell being retrieved is zero, no cells may be retrieved and therefore the request is invalid. Thus, the Frame Invalid molecule may provide an indication from the switch to the requesting interface device that the retrieval count field associated with a cell being retrieved (e.g., provided in the Buffer Table) is zero. In other words, the retrieval count (i.e., pending retrievals) is zero and therefore the frame has already been retrieved.

Once the switch receives the Frame Request molecule, the switch fetches the cell data from the Data Buffer and the cell data is sent to the requesting interface device. The retrieval delta 916 is subtracted from the retrieval count field in the Buffer Table for the associated buffers. If the cell count 918 isgreater than 1, the frame's next cell is automatically fetched and delivered. The interface device's receipt of the last requested cell acts as an acknowledgment of the processing of the Frame Request molecule.

The Frame Storage molecule provides feedback from the switch to the interface device regarding the state of stored cells and switch congestion. Referring next to FIG. 10, a diagram illustrating an exemplary format for a Frame Storage molecule according to an embodiment of the invention is presented. A Frame Storage molecule 1002 includes a molecule class type 1004 (e.g., Frame Storage designation) as well as a Frame Storage molecule type 1006. Frame Storage molecule types 1006 will be described in further detail below. A buffer number 1008 associated with one or more cells may be specified. In addition, a thread number 1010 associated with the thread issuing the Buffer Status molecule (e.g., Buffer Status Request or Buffer Status Acknowledgment) or to which a switch reply is addressed is specified. Moreover, a rejection code 1012 may be specified. Exemplary rejection codes are described below.

There are various types of Frame Storage molecules as specified by the Frame Storage molecule type field 1006. These Frame Storage molecules include a Buffer Status Request, a Storage Reply, and a Buffer Status Acknowledgment. A Buffer Status Request molecule may be sent by an interface device to the switch in order to request the congestion status for the thread specified in the thread number field 1010. In this manner, an interface device may determine whether more frames may be stored. In response, a Buffer Status Acknowledgment molecule indicating the congestion status requested by the interface device is returned by the switch.

In order to store a frame, a source device sends the corresponding cells to the switch. When the frame is stored by the switch, a Storage Reply molecule is sent by the switch to a source device. More particularly, a Storage Reply molecule may be sent for each cell of the frame. Frame storage may be initiated with the transfer to the switch of a cell whose start bit is set. The switch will then determine if the frame can be accepted and will respond with a Storage Reply molecule to verify that the each cell of the frame has been stored. Each Storage Reply molecule specifies the location of a cell (or the beginning of a frame) being stored. More particularly, the Storage Reply molecule may return a pointer (e.g., buffer number) to the cell being stored and a rejection code. The buffer number of the first cell of a frame may be used to reference the entire frame due to the linked list maintained by the switch. Thus, this buffer number may subsequently be included in notifications of pending frame retrievals to destination devices.

Once a frame is sent to the switch for storage, it may be rejected for various reasons. A rejection code may therefore be specified in the rejection code field 1012 of the Storage Reply molecule for this purpose. Thus, the rejection code may indicate that the frame or cell has been accepted and there is no congestion. Alternatively, the rejection code may indicate that the frame or cell has been accepted even though the data buffer is congested. This may therefore serve as a warning that space in the data buffer is limited. Moreover, the rejection code may indicate that the frame or cell is rejected due to bandwidth or buffer shortage. This therefore indicates to the interface device that the first and all subsequent cells for the frame in question have been discarded by the switch. The interface device may either re-submit the frame at a later time or discard it. In this manner, the Frame Storage molecule class provides information to the source interface device regarding the fate of the frames and cells that have been sent to the switch.

When the switch rejects a cell, there may be an implied rejection for all subsequent cells of the same frame. In other words, the switch may automatically reject all subsequent cells with the same thread number value, regardless of whether or not the reasons for rejecting the first cell still exist. Since the rejection code value may be the same as that issued for the first rejected cell of the frame, the cell rejections continue for the thread number until a cell whose start bit is asserted is submitted to the switch. That cell's acceptance/rejection is then evaluated based on current conditions.

The switch will delete the frame from storage when the number of pending retrievals for the frame is zero. More particularly, according to one embodiment, the frame cannot be deleted without the assertion of an end bit for the last cell in the frame. In addition to removing the frame from storage upon retrieval of the frame, such removal may also be desirable when the switch becomes congested while a frame is being stored. When this occurs, the switch may provide an appropriate rejection code to indicate that the frame should be re-sent by the interface device. In addition, it may be desirable to remove from storage the portion of the frame that has been stored. Thus, if the first cell rejected for a frame is not the first cell of the frame, the switch may assert the end bit for the last cell accepted for the frame. This makes it a simple matter for the interface device to submit a Buffer Table Subtract molecule to delete the first several cells of the frame without having to first store a cell whose end bit is asserted.

Figure 11:
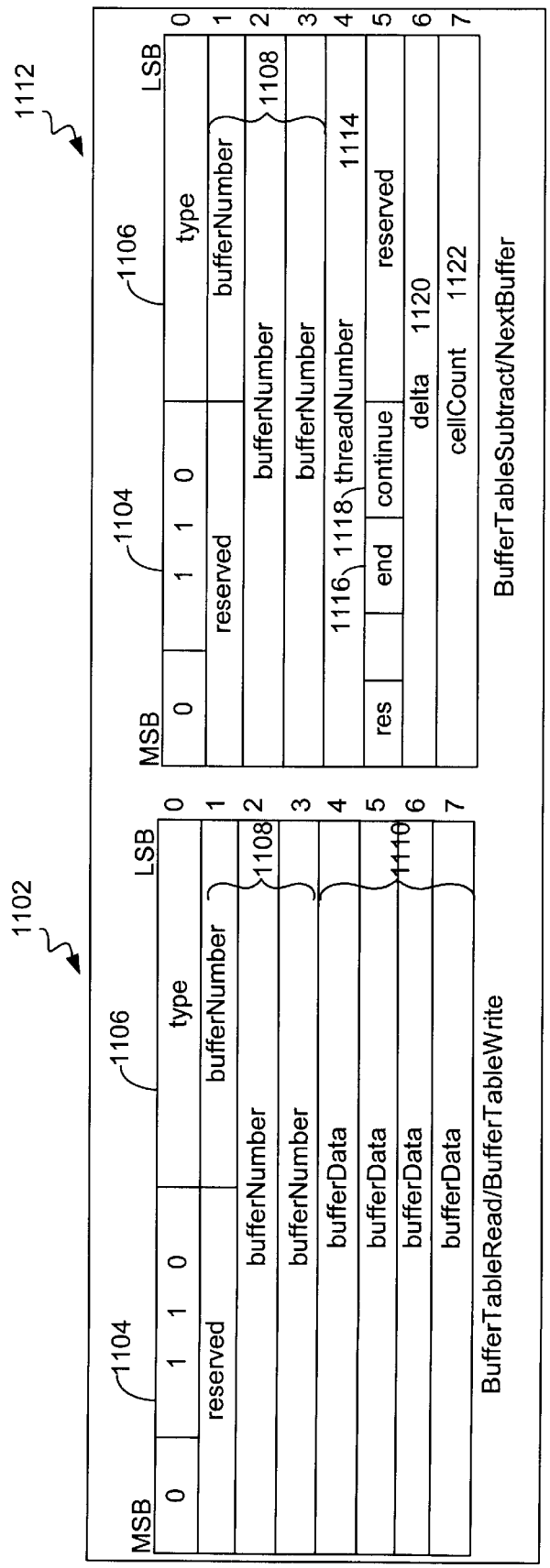
FIG. 11 is a diagram illustrating an exemplary Buffer Table Access molecule format according to an embodiment of the invention.

Buffer Table Access molecules may be used to determine and modify the contents of the switch's buffer table. They may be used to allow system initialization as well as modification to various fields of a buffer table entry. FIG. 11 is a diagram illustrating an exemplary Buffer Table Access molecule format. Two possible formats are presented. A first format for the Buffer Table Access molecule is presented for use with Buffer Table Read and Buffer Table Write molecules. A Buffer Table Read molecule may be used to return at least a portion of a buffer table entry. By way of example, the buffer table entry may be associated with a specified buffer number. The next buffer/next free buffer field of the table entry may then be accessed. In this manner, the next buffer (e.g., next free buffer) of a linked list of buffers may be identified. By way of example, the next buffer may point to the next buffer and therefore the next cell in the frame associated with that Buffer Table entry. As yet another example, the next buffer may point to a free buffer in a free list. According to one embodiment, a Buffer Table Read Low molecule is provided to return a low word in the buffer table entry and a Buffer Table Read High molecule is provided to return a high word in the buffer table entry. More particularly, these molecules may access the end, buffer owner, and retrieval count fields of each buffer table entry.

Similarly, a Buffer Table Write molecule may be used to replace at least a portion of a buffer table entry. By way of example, the buffer table entry may be associated with a specified buffer number. The next buffer/next free buffer field of the table entry may then be accessed. In this manner, the next buffer (e.g., next free buffer) may be identified. According to one embodiment, a Buffer Table Write Low molecule is provided to replace a low word in the buffer table entry and a Buffer Table Write High molecule is provided to replace a high word in the buffer table entry. These molecules may access the end, buffer owner, and retrieval count fields of each buffer table entry.

A second format for the Buffer Table Access molecule is presented for use with Buffer Table Subtract and Next Buffer molecules. Where there is a discrepancy between the number of pending retrievals and number of destinations capable of retrieving the data intended for them, a Buffer Table Subtract molecule may be sent by a source interface device to adjust the pending retrieval count field of the appropriate buffer table entries. In addition, a Next Buffer molecule may be used to ascertain the next cell in a frame being written or read. In this manner, the switch may ascertain the next pending retrieval for a particular thread.

In order to process instructions such as those provided by the Buffer Table Subtract and Next Buffer molecules, it is important to be able to advance one or more cells in the frame. As a result, a progress pointer is maintained by the switch for each thread. This progress pointer will be hereinafter referred to as the thread's internal frame retrieval progress pointer. Thus, through the use of a Next Buffer molecule, the value of the thread's internal frame retrieval progress pointer may be returned. In this manner, the pointer may be advanced such that the cells in the frame may be skipped or traversed. Accordingly, the buffer number for a particular cell in a frame may be ascertained.

The first format 1102 includes a class type 1104 (e.g., Buffer Table Access) and Buffer Table Access type field 1106. Possible Buffer Table Access types are defined below. In addition, a buffer number 1108 and buffer data 1110 are provided.

Similarly, the second format 1112 also includes the class type 1104 (e.g., Buffer Table Access) and Buffer Table Access type field 1106. In addition to providing the buffer number 1108, a thread number 1114 of the thread whose frame retrieval progress pointer should be referenced is also provided. In a reply (e.g., Buffer Table Data Reply provided in response to the Buffer Table Read and Write molecules), end field 1116 indicates that the end of the frame was encountered during the requested operation. A frame retrieval progress pointer may be provided for each thread. In this manner, the switch may track where each thread is in the retrieval process. Thus, a continue field 1118 directs the switch to access the frame retrieval progress pointer that points to the next buffer being retrieved and pick up where it left off for the operation related to the same thread. The continue field 1118 is asserted when issuing a Next Buffer molecule.

As described above, for each cell stored in the Data Buffer, a retrieval count specifying a number of pending retrievals is provided. Thus, for each time the cell or frame is retrieved, the retrieval count is decremented. Thus, the switch will subtract the amount specified in delta field 1120 from the retrieval count for one or more cells starting with the cell associated with the supplied buffer number and traversing the linked list as directed by the cell count field. By way of example, a Buffer Table Subtract molecule may specify that the retrieval count be decremented to account for the number of destinations unable to copy the Frame Notify message and therefore unable to retrieve the data. More particularly, delta is subtracted from the retrieval count field of the buffer table entry pointed to by the buffer number. If continue is asserted, the switch will ignore the buffer number and will use its internal frame retrieval progress pointer as a pointer to the next Buffer Table entry to be modified. In this manner, Buffer Table Subtract follows a series of associated cells and performs the subtraction on each cell until an "end" cell is detected. In addition, a cell count field 1122 specifies the number of cells to be processed or traversed (e.g., read or written). By way of example, the cell count field 1122 may be set to 1 to return the value of a thread's internal frame retrieval progress pointer using a Next Buffer molecule.

In response to a Buffer Table Read or Write molecule, the switch may send a Buffer Table Data Reply molecule to the requesting interface device. Using the buffer number provided in the original request from the interface device, the buffer data in the buffer data field reflects the current contents of the buffer table entry pointed to by the buffer number.

Similarly, in response to a Buffer Table Subtract or Next Buffer type molecule, the switch may generate a Buffer Table Cell Count Reply molecule. By way of example, end may be asserted to indicate that the buffer number is not valid. As yet another example, if end is not asserted, this may indicate that the cell count (number of cells to be traversed) of the reply differs from the cell count field of the Buffer Table Subtract or Next Buffer molecule that initiated the reply. Accordingly, through the use of Reply molecules, the interface device may be notified that the requested operation is complete.

As previously described, a Data Buffer may be used to store each cell payload. More particularly, each buffer in the Data Buffer stores a single cell payload. In order to link these data buffers to create a single frame, a pointer to the next buffer as well as other information may be associated with each buffer in the Data Buffer. Thus, a Buffer Table may be used to store information associated with each buffer in the Data Buffer. An exemplary Buffer Table Entry Format is illustrated in FIG. 12. Each buffer table entry may store information obtained from the cell header such as the number of pending retrievals for the cell and the buffer or thread owner. A single buffer table entry 1200 includes information associated with a buffer that stores a cell payload. The end field from the cell header may be stored in end field 1202. Similarly, the start field from the cell header may be stored in start field 1204. As described above, the start and end fields 1202, 1204 may be used in combination to indicate the location of the cell within the frame. In addition, the cell header's payload length field may be specified in a payload length field 1206 of the buffer table entry. The payload length may be used to indicate the number of valid payload bytes in the associated cell. A buffer owner field 1208 may identify the thread that caused the buffer to become allocated. This information may therefore be used by the switch for buffer management purposes. In addition, the buffer table entry 1200 may include a retrieval count field 1210 that specifies the number of times that a particular cell is to be retrieved from the data buffer. The cell header's bad frame field 1212, FCS mode field 1214, and priority field 1216 may similarly be provided in the buffer table entry. Multiple cells within a single frame may be linked through a data structure such as a linked list. Therefore, a next buffer field 1218 may be provided to point to the next buffer in the frame. When a buffer is on a free list, the next buffer field 1218 may contain a pointer to a buffer in the free list. Where the end field 1202 is 513 asserted, there are no more cells in the frame and therefore the next buffer field 1218 is invalid.

Multiple cells within a frame may be read or written through the use of a Next Buffer molecule. More particularly, the Next Buffer molecule may be used to access the Buffer Table describing the Data Buffer. As described above, the Next Buffer molecule may be used to determine the buffer number of the next cell to be retrieved. When issuing a Next Buffer molecule, the continue field is asserted and the cell count field may be 1.

When a source interface device sends cells to the switch for storage, the switch stores the cells. The cells may then be retrieved by one or more destination interface devices. However, in order for the cells to be obtained by the destination interface devices, the destination interface devices must be notified of the pending retrieval. Thus, the source interface device sends a Frame Notify message on the notify ring to notify the destination interface devices of these cells that are pending retrieval. An exemplary Frame Notify message is illustrated in FIG. 13. The Frame Notify message 1300 includes the message class 1302 (e.g., Frame Notify) and a source thread 1304 specifying the number of the thread that stored the frame.

When the Frame Notify message is observed by a destination device, the destination device may not be able to accept the Frame Notify message and therefore may be unable to retrieve the data intended for it. It is therefore desirable to communicate to the source device whether each intended destination device could successfully accept the Frame Notify message. Thus, a destination field 1306 may be provided in the Frame Notify message to indicate those destination devices that could successfully retrieve and store the Frame Notify message. As described above, the Frame Notify message specifies the location of the stored data in the form of a buffer number. Each destination device may place this buffer number on the appropriate notify queue. By way of example, the entire Frame Notify message may be copied into the destination device's notify queue. The specified destination devices may then request one or more cells identified by the buffer number 1308 specified in the Frame Notify message 1300.

As described above, data stored by the switch may be prioritized or otherwise categorized. This priority level or categorization may be indicated in the Frame Notify message observed by each destination device. It may be therefore be desirable to provide multiple notify queues for a single destination device or port to accommodate these different priorities or categories. Thus, a notify queue map field 1310 may be provided to indicate one or more queues to which the Frame Notify message is directed. By way of example, a single bit may be used to specify a single notify queue. Thus, a 32-bit field may be used to specify a group of up to 32 notify queues that are destinations for a single Frame Notify message. As yet another example, multiple bits may be used in combination to specify further information such as priority, type of cell data, and other relevant information for a single notify queue. For instance, not all cells identified by frame notifications are intended for transmission by the destination devices receiving the frame notifications. As a result, it may be desirable to provide such information in the notify queue map. In this manner, the notify queue map may permit Frame Notify messages to be routed to a large number of queues having varying uses and priorities. The destination field 1306 may therefore be used to identify the appropriate destination queue or set of queues in the notify queue map field 1310. By way of example, the notify queue map field 1310 may include multiple sets of bits, each set associated with a different queue or set of queues. According to one embodiment, each such set of bits is 32 bits. Moreover, the destination field 1306 may be used to turn off the appropriate bit in the notify queue map field 1310 when the Frame Notify message is accessed by a destination device. Thus, when the modified Frame Notify message is received by the source device, the source device may determine which destination devices were capable of retrieving the Frame Notify message. In this manner, a source device may ascertain whether a destination device has a full or disabled notify queue.

Figure 14A:
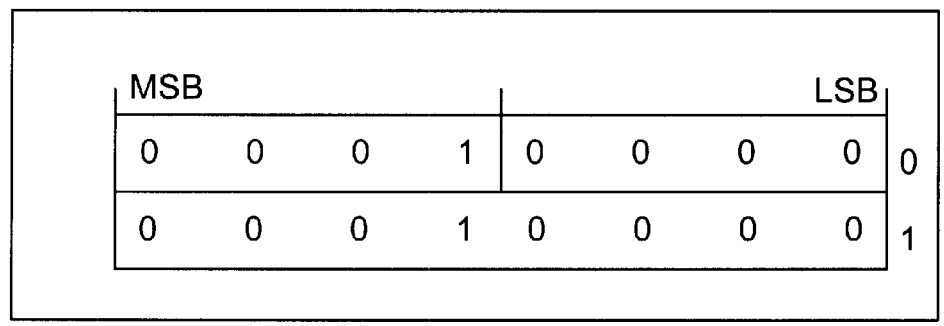
FIG. 14A is a diagram illustrating an exemplary format for a free slot symbol.

When idle or not fully occupied, the notify ring circulates one or more free slot symbols. In this manner, the size of the notify ring is maintained. When a source device desires to send a Frame Notify message on the notify ring, it expands the notify ring by replacing a free slot symbol with a Frame Notify message. FIG. 14A illustrates an exemplary format for an idle symbol or "free slot symbol". As shown, a free slot symbol may comprise 2 bytes. Since a Frame Notify message may comprise 10 bytes as indicated above, the notify ring is expanded as a result of the free slot symbol replacement. Frame notifications that are returned to the source interface device may be replaced by a new frame notification or a free slot symbol. In this manner, delay buffering is provided for each Frame Notify message inserted into the notify ring.

Figure 14B:
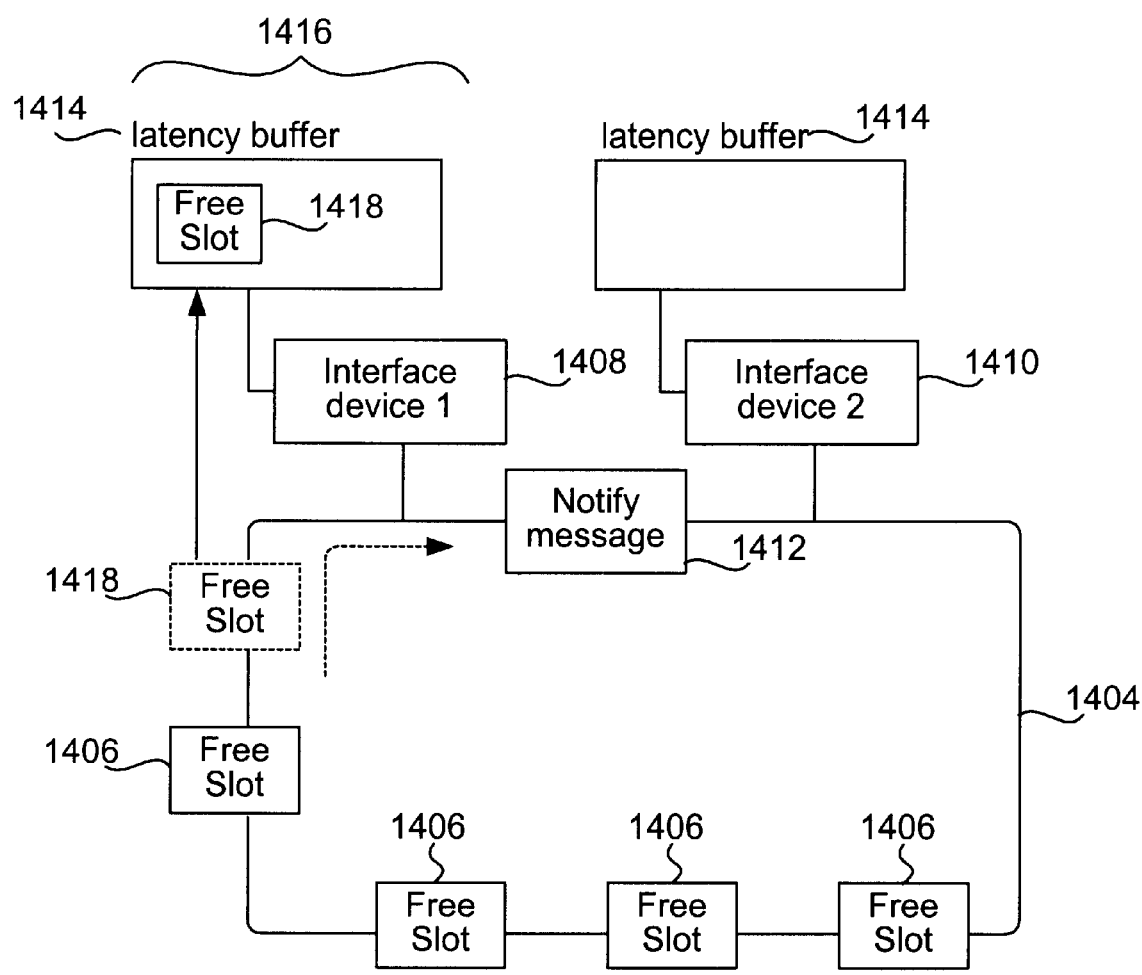
FIG. 14B is a block diagram illustrating the replacement of a free slot symbol with a notify message according to one embodiment of the invention.

The notify ring may be used to create a variable latency data transport bus that functions as follows. As shown in FIG. 14B, ring interconnect 1404 continuously passes free slot symbols 1406 from one attached device 1408 to the next attached device 1410. When a device wishes to send a message on the ring 1404, it claims a free slot symbol and replaces it with the message 1412 (e.g., frame notify message). According to one embodiment, messages are greater in length than free slot symbols. A long message is able to replace a short free slot symbol because the attached device redirects all traffic on the ring through an associated latency buffer 1414 whose length 1416 matches the difference in length between the free slot symbol 1418 and the inserted message 1412. Hence, all traffic that follows the claimed free slot symbol may be delayed to make room for the inserted message. When the frame notification message has traversed the entire ring and returned to its source, the frame notification message may be replaced with a free slot symbol and the latency buffer may be bypassed. Alternatively, the frame notification may be replaced by a new frame notification. This scheme allows for the high bandwidth interconnect of devices at low latency while the system is relatively idle, with the latency increasing as the system becomes more busy. Thus, this access method enables messages to be passed across the bus with low latency when the system is quiet and with increased latency when the system is busy.

Figure 15:
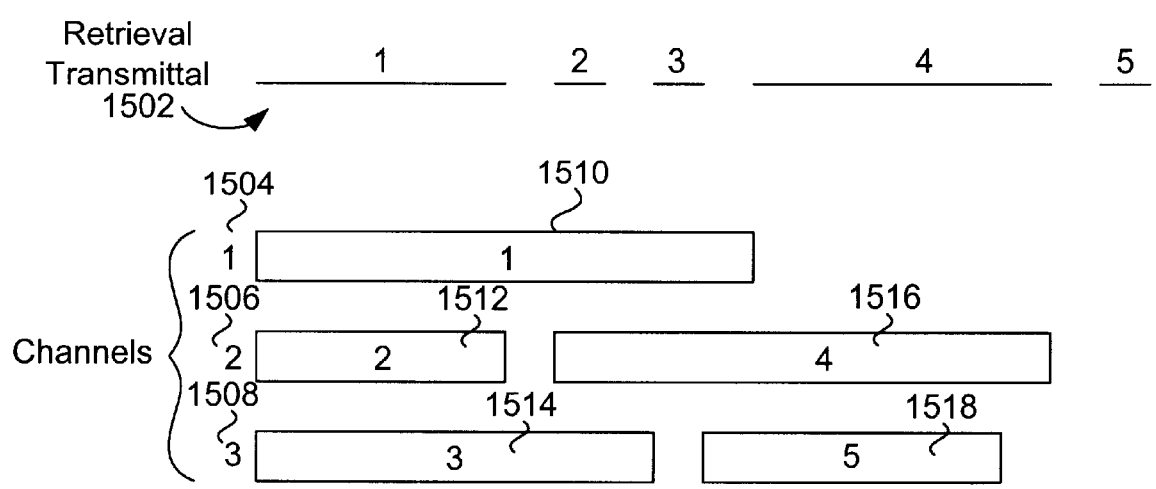
FIG. 15 is a diagram illustrating the use of channel grouping during retrieval and transmission of frames by a destination device and receipt and storage of frames by the switch.

When a destination device retrieves frames from the switch, the network connection may operate at a faster speed than the channels. As a result, it may be desirable to group the channels together. FIG. 15 is a diagram illustrating the use of channel grouping during retrieval and transmission of frames by a destination device and receipt and storage of frames by the switch. Although it may seem an easy task to group channels, this is complicated by the fact that retrieval completion of frames depends on frame length, not on the order requests are made. As shown at 1502, the destination device wishes to retrieve the frames corresponding to buffer numbers 1 through 5. Moreover, it is important that the order of the frames transmitted by the destination device remains the same as the order implied by the order of frame notifications received by the destination interface device (and the order that the frames were received by the destination interface device). According to one embodiment, the next available channel (e.g., a channel that is currently idle) is used to retrieve or transmit a frame. As shown in FIG. 15, there are three channels, channel 1 1504, channel 2 1506, and channel 3 1508. Due to the length of the frames and varying completion times, the frames are placed on the three channels in the following order. Frame 1 1510 is placed on the first channel 1504, frame 2 1512 is placed on the second channel 1506, frame 3 1514 is placed on the third channel 1508, frame 4 1516 is placed on the second channel, and frame 5 1518 is placed on the third channel 1508. Since the frames differ in length and the frame completion times vary, frame 3 1514 is held until it can be transmitted in the order in which it was received. In this manner, the order in which frames are retrieved and transmitted remain consistent with the order of frame notifications.

A similar problem arises during receipt and storage of frames by the switch. Due to the next available channel rule, the switch starts storing data as soon as packets are received by the switch. Although the switch does not care about the order in which the data is stored, the switch wishes to send Frame Notifications in the order in which packets are received. In this manner, the transmission order and reception order remain the same. Accordingly, pending notifications are held until they may be sent out in the correct order.

It is important to note that typically, each channel is associated with a particular queue. According to the present invention, notification messages and queues are unrelated to channels used to transmit data. Since there is no required association between queues and channels, multiple channels may service a single queue.

As described above, the notify ring may be expanded to accommodate communication between interface devices. The communication between the interface devices and the switch is therefore performed on one or more channels rather than the notify ring. As a result, the flexibility of the notify ring does not effect the speed with which the interface devices may communicate with the switch. Thus, where a single port operates at a faster speed than the channels, multiple channels may be grouped together. In this manner, the speed with which the switch may communicate with the interface devices may be maximized.

The present invention provides a mixed topology data switching system that combines a point-to-point radial interconnect with a ring interconnect to maximize the speed of network traffic. The radial interconnect provides a narrow, high baud-rate connection to convey the data traffic for just the interface in question, without being burdened by all of the unrelated traffic for the remaining interfaces in the system. At the same time, the ring interconnect permits retrieval notifications to be observed by all potential retrieving interfaces. The ring topology farther permits each destination interface to provide feedback to the source interface, which is valuable for buffer management applications. Moreover, the point-to-point ring topology bus employs a variable latency access method that enables messages to be passed across the bus with low latency when the system is quiet and with increased latency when the system is busy. In addition, since control messaging around the ring interconnect and across the channel interconnects are embedded in the data stream, the number of pins required and manufacturing costs are reduced.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described the conveyance of data in the form of frames, cells, and molecules, other types of data can be conveyed as well, and therefore such terms are used to describe the relative size of the data being conveyed. Accordingly, the present embodiments are to be considered as illustrative and not restrictive, and the invention is not to be limited to the details given herein, but may be modified within the scope and equivalents of the appended claims.

What is claimed is:

1. In a switch connected to a source network device and one or more destination devices via associated interconnects, the switch having a data buffer associated therewith, a method of storing data, comprising:

receiving data from a source network device connected to the switch via the associated interconnect;

storing the data in the data buffer;

sending a frame storage message indicating that the data has been successfully stored for retrieval by one or more destination devices to the source network device via the associated interconnect, said frame storage message specifying a location of the data in the data buffer;

receiving a frame retrieval message associated with the data from one of the destination network devices;

sending the data to the one of the destination network devices in response to receiving the frame retrieval message;

maintaining a retrieval count that indicates a number of the one or more destination network devices that remain to retrieve the data;

receiving a buffer table subtract message to decrement the retrieval count equivalent to a number of the one or more destination network devices that are unable to retrieve the data; and decrementing the retrieval count in response to the buffer table subtract message.

2. The method as recited in claim 1, further comprising:

removing the data from the data buffer when the retrieval count is equal to zero.

3. In a switch connected to a source network device and one or more destination devices via associated interconnects, the switch having a data buffer associated therewith, a method of storing data, comprising:

receiving data from a source network device connected to the switch via the associated interconnect;

storing the data in the data buffer;

sending a frame storage message indicating that the data has been successfully stored for retrieval by one or more destination devices to the source network device via the associated interconnect, said frame storage message specifying a location of the data in the data buffer;

receiving a frame retrieval message associated with the data from one of the destination network devices;

sending the data to the one of the destination network devices in response to receiving the frame retrieval message;

maintaining a retrieval count that indicates a number of the one or more destination network devices that remain to retrieve the data;

decrementing the retrieval count in response to sending the data or receiving the frame retrieval message; and removing the data from the data buffer when the retrieval count equal to zero.

4. In a switch having a memory associated therewith, the memory including a general memory and a plurality of dedicated memory segments, the general memory being available to a plurality of users associated with one or more network devices and each one of the plurality of dedicated memory segments being associated with one of the plurality of users, a method of storing and retrieving data, comprising:

receiving data from a source network device connected to the switch; and storing the data in a data buffer, wherein storing the data in a data buffer includes distributing the general memory and the plurality of dedicated memory segments such that a portion of one of the plurality of dedicated memory segments is allocated when the general memory has been depleted.

5. The method as recited in claim 4, wherein distributing the general memory and the plurality of dedicated memory segments includes allocating the general memory on a first come, first served basis.

6. The method as recited in claim 5, wherein distributing the general memory and the plurality of dedicated memory segments further includes allocating the plurality of dedicated memory segments when the general memory is depleted.

7. The method as recited in claim 4, further comprising:

denying a request for memory from one of the plurality of users when the associated one of the plurality of dedicated memory segments is consumed.

8. In a switching system having a memory associated therewith, a method of allocating the memory among a plurality of users, the method comprising:

providing a general memory available to the plurality of users;

providing a plurality of dedicated memory segments, each one of the plurality dedicated memory segments being associated with one of the plurality of users; and distributing the general memory and the plurality of dedicated memory segments such that a portion of one of the plurality of dedicated memory segments is allocated when the general memory has been depleted.

9. The method as recited in claim 8, wherein distributing the general memory and the plurality of dedicated memory segments includes allocating the general memory on a first come, first served basis.

10. The method as recited in claim 9, wherein distributing the general memory and the plurality of dedicated memory segments further includes allocating the plurality of dedicated memory segments when the general memory is depleted.

11. The method as recited in claim 8, further comprising:

denying a request for memory from one of the plurality of users when the associated one of the plurality of dedicated memory segments is consumed.

12. A switch having a memory associated therewith, the memory including a general memory and a plurality of dedicated memory segments, the general memory being available to a plurality of users associated with one or more network devices and each one of the plurality of dedicated memory segments being associated with one of the plurality of users, comprising:

means for receiving data from a source network device connected to the switch; and means for storing the data in a data buffer, wherein storing the data in a data buffer includes distributing the general memory and the plurality of dedicated memory segments such that a portion of one of the plurality of dedicated memory segments is allocated when the general memory has been depleted.

13. A switching system, comprising:

a general memory available to the plurality of users;

a plurality of dedicated memory segments, each one of the plurality dedicated memory segments being associated with one of the plurality of users; and means for distributing the general memory and the plurality of dedicated memory segments such that a portion of one of the plurality of dedicated memory segments is allocated when the general memory has been depleted.

14. A switch having a memory associated therewith, the memory including a general memory and a plurality of dedicated memory segments, the general memory being available to a plurality of users associated with one or more network devices and each one of the plurality of dedicated memory segments being associated with one of the plurality of users, comprising:

a processor; and a memory, at least one of the processor and the memory being adapted for:

receiving data from a source network device connected to the switch; and storing the data in a data buffer, wherein storing the data in a data buffer includes distributing the general memory and the plurality of dedicated memory segments such that a portion of one of the plurality of dedicated memory segments is allocated when the general memory has been depleted.

15. A computer-readable medium storing thereon computer-readable instructions for storing and retrieving data in a switch having a memory associated therewith, the memory including a general memory and a plurality of dedicated memory segments, the general memory being available to a plurality of users associated with one or more network devices and each one of the plurality of dedicated memory segments being associated with one of the plurality of users, comprising:

instructions for receiving data from a source network device connected to the switch; and instructions for storing the data in a data buffer, wherein storing the data in a data buffer includes distributing the general memory and the plurality of dedicated memory segments such that a portion of one of the plurality of dedicated memory segments is allocated when the general memory has been depleted.

* * * * *